United States Patent
Nogami et al.

(10) Patent No.: US 8,536,995 B2
(45) Date of Patent: Sep. 17, 2013

(54) INFORMATION DISPLAY APPARATUS AND INFORMATION DISPLAY METHOD

(75) Inventors: Tateaki Nogami, Kanagawa (JP); Kazuhiko Iwai, Kanagawa (JP); Yuki Waki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/255,296

(22) PCT Filed: Dec. 8, 2010

(86) PCT No.: PCT/JP2010/007156
§ 371 (c)(1),
(2), (4) Date: Sep. 8, 2011

(87) PCT Pub. No.: WO2011/070783
PCT Pub. Date: Jun. 16, 2011

(65) Prior Publication Data
US 2012/0235805 A1    Sep. 20, 2012

(30) Foreign Application Priority Data
Dec. 10, 2009   (JP) ................................. P2009-280559

(51) Int. Cl.
*B60Q 1/00* (2006.01)
(52) U.S. Cl.
USPC .......................................................... 340/441
(58) Field of Classification Search
USPC ................. 340/441, 903, 937, 436; 382/107; 701/301
See application file for complete search history.

(56) References Cited

U.S. PATENT DOCUMENTS 7,190,282 B2 * 3/2007 Maemura et al. ............. 340/903
2005/0278113 A1 * 12/2005 Maruyama et al. ........... 701/208
2006/0022808 A1 * 2/2006 Ito et al. ..................... 340/425.5

FOREIGN PATENT DOCUMENTS

| JP | 2006-264507 A | 10/2006 |
| JP | 2008-257378 A | 10/2008 |
| JP | 2009-017572 A | 1/2009 |
| JP | 2009-277021 A | 11/2009 |

OTHER PUBLICATIONS

Kimuro et al; "Adaptive visual effect for multi-display environment using head pose", The Institute of Electronics, Information and Communication Engineers, Technical Report of IEICE, HIP 2006-135, pp. 43-48.
International Search Report for PCT/JP2010/007156 dated Mar. 15, 2011.

* cited by examiner

*Primary Examiner* — Phung Nguyen
(74) *Attorney, Agent, or Firm* — Pearne & Gordon LLP

(57) ABSTRACT

An aspect of the invention provides an information display apparatus and an information display method which allow a driver to easily recognize the display information without discomfort, regardless of the traveling state of a vehicle. It includes an attention object detecting unit (32) which detects information to be displayed to the driver, a symbol image selecting unit (33) which sets a symbol image to be displayed for the driver, an optical flow calculating unit (34a) which detects an optical flow of a foreground of the own vehicle, a motion effect determining unit (35) which sets a motion effect to be added to the symbol image, a display image generating unit (36) which generates a display image in which the motion effect added by the motion effect determining unit is combined with the symbol image, and a display control unit (37) which displays the generated display image for the driver. The motion effect determining unit (35) changes the motion effect to be added to the symbol image in accordance with the traveling state of the vehicle.

9 Claims, 34 Drawing Sheets

FIG. 4

| KIND OF DETECTION INFORMATION | PEDESTRIAN | BICYCLE | VEHICLE |
|---|---|---|---|
| SYMBOL IMAGE | 🚶 | 🚲 | 🚗 |

| ID | OPTICAL FLOW CONDITION | MOTION EFFECT |
|---|---|---|
| 001 | MAGNITUDE OF FLOW VECTOR < α | NOTHING |
| 002 | MAGNITUDE OF FLOW VECTOR ≥ α AND MAGNITUDE OF VERTICAL COMPONENT OF FLOW VECTOR < MAGNITUDE OF HORIZONTAL COMPONENT OF FLOW VECTOR | LONGITUDINAL VIBRATION |
| 003 | MAGNITUDE OF FLOW VECTOR ≥ α, MAGNITUDE OF HORIZONTAL COMPONENT OF FLOW VECTOR ≤ MAGNITUDE OF VERTICAL COMPONENT OF FLOW VECTOR, AND MAGNITUDE OF VERTICAL COMPONENT OF FLOW VECTOR ≤ β + MAGNITUDE OF HORIZONTAL COMPONENT OF FLOW VECTOR | LATERAL VIBRATION |
| 004 | MAGNITUDE OF FLOW VECTOR ≥ α AND β + MAGNITUDE OF HORIZONTAL COMPONENT OF FLOW VECTOR < MAGNITUDE OF VERTICAL COMPONENT OF FLOW VECTOR | LATERAL VIBRATION + ENLARGEMENT |

α: THRESHOLD VALUE FOR DETERMINING WHETHER TO GIVE MOTION EFFECT
β: THRESHOLD VALUE WHICH IS STANDARD FOR DETERMINING WHETHER TO ADD MOTION EFFECT "ENLARGEMENT"

FIG. 11
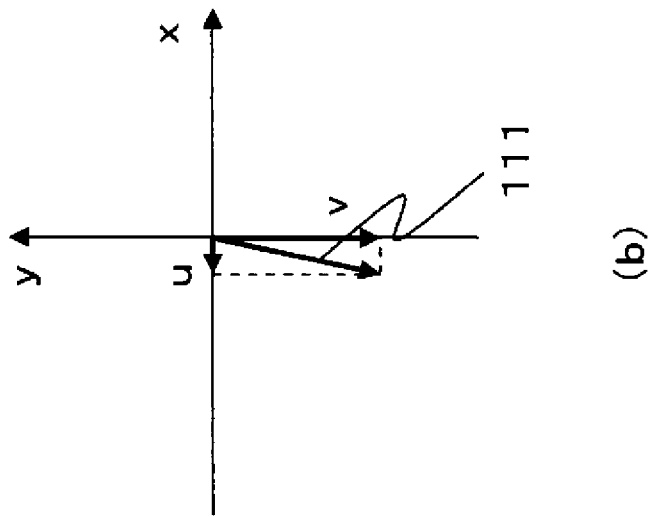
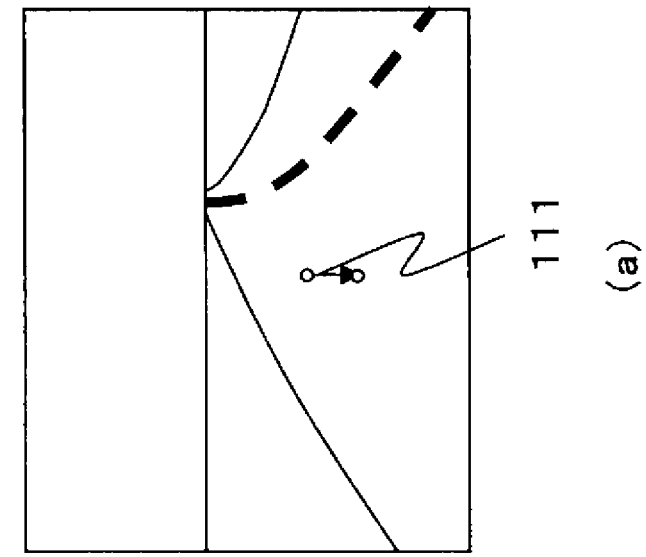

| SPEED OF VEHICLE [km/h] | ANGULAR VELOCITY OF VEHICLE [rad/s] | ANGLE FORMED BETWEEN HORIZONTAL COMPONENT AND VERTICAL COMPONENT OF OPTICAL FLOW [rad] |
|---|---|---|
| $a_0$ | $\omega_0$ | $\theta_0$ |
| $a_1$ | $\omega_1$ | $\theta_1$ |
| $a_2$ | $\omega_2$ | $\theta_2$ |
| ... | ... | ... |

(b)

| POSITIONAL COORDINATES OF ROAD SURFACE | | | SPEED OF VEHICLE [km/h] | ANGULAR VELOCITY OF VEHICLE [rad/s] | ANGLE FORMED BETWEEN HORIZONTAL COMPONENT AND VERTICAL COMPONENT OF OPTICAL FLOW [rad] |
|---|---|---|---|---|---|
| X | Y | Z | | | |
| $X_0$ | $Y_0$ | $Z_0$ | $a_0$ | $\omega_0$ | $\theta_0$ |
| $X_0$ | $Y_0$ | $Z_1$ | $a_1$ | $\omega_1$ | $\theta_1$ |
| $X_0$ | $Y_0$ | $Z_2$ | $a_2$ | $\omega_2$ | $\theta_2$ |
| ... | ... | ... | ... | ... | ... |
| $X_l$ | $Y_m$ | $Z_n$ | | | |
| ... | ... | ... | | | |

FIG. 17

| SET VALUE | BACKGROUND POSITION OF HUD | | |
|---|---|---|---|
| | X | Y | Z |
| 1 | $X_0$ | $Y_0$ | $Z_0$ |
| 2 | $X_0$ | $Y_0$ | $Z_1$ |
| 3 | $X_0$ | $Y_0$ | $Z_2$ |
| 4 | ... | ... | ... |
| 5 | $X_l$ | $Y_m$ | $Z_n$ |
| ... | ... | ... | ... |

FIG. 28

| ID | 001 | 002 | 003 |
|---|---|---|---|
| KIND OF IN-VEHICLE INFORMATION | PEDESTRIAN | BICYCLE | VEHICLE |
| IN-VEHICLE INFORMATION IMAGE | 🚶 | 🚲 | 🚗 |

| ID | OPTICAL FLOW CONDITION | MOTION EFFECT |
|---|---|---|
| 001 | MAGNITUDE OF VECTOR < α | NOTHING |
| 002 | HORIZONTAL COMPONENT > VERTICAL COMPONENT | LONGITUDINAL VIBRATION |
| 003 | HORIZONTAL COMPONENT ≤ VERTICAL COMPONENT | LATERAL VIBRATION |
| 004 | HORIZONTAL COMPONENT + β < VERTICAL COMPONENT | LATERAL VIBRATION + ENLARGEMENT |
| ... | ... | ... |

2900

α: THRESHOLD VALUE FOR DETERMINING WHETHER TO GIVE MOTION EFFECT

β: THRESHOLD VALUE WHICH IS STANDARD FOR DETERMINING WHETHER TO ADD MOTION EFFECT "ENLARGEMENT"

INFORMATION DISPLAY APPARATUS AND INFORMATION DISPLAY METHOD

TECHNICAL FIELD

The present invention relates to an information display apparatus and an information display method that display information for supporting the driving of a driver.

BACKGROUND ART

In recent years, the number of instruments and functions provided in vehicles has increased. When driving the vehicle, the driver needs to process various kinds of information acquired from the inside and outside of the vehicle.

Various kinds of information processed by the driver include, for example, information on the speed of the vehicle, the number of revolutions of the engine, a radio channel number displayed on a center console, information on a music track number, information on the map which is displayed on the screen of a car navigation system or route guidance, and information for supporting driving safety, such as information for warning the driver against danger around the vehicle.

In general, the driver visually acquires information displayed on an instrument panel or a center console panel. However, when there is a large difference between the direction of the driver's eye and the direction in which information is displayed or when the distance between the driver and the display position of the information is large, the driver must move the line of sight or adjusts a focus in order to check the content of the information.

In order to significantly reduce the amount of movement of the direction of the driver's eye or the amount of adjustment of the focus, a head-up display (HUD) has been developed. The HUD is a display that displays predetermined information in a specific range from the upper part of the dash board of the vehicle to the windshield.

For example, there are two types of HUDs, that is, a type in which the driver directly views a display apparatus, such as a liquid crystal display or an OELD (Organic Electroluminescent Display) and another type that projects light emitted from a liquid crystal display, an OELD, or a display apparatus including a laser light source onto the windshield.

The use of the HUD makes it possible to reduce the time required for the driver to move the eye in order to view the display when the driver drives the vehicle while viewing the front, as compared to the case in which the driver views the instrument panel or the center console.

The type of HUD in which light is projected onto the windshield is characterized in that display information overlaps the foreground of the vehicle and can reduce the optical path length between the driver and the display apparatus. In this way, the driver can view the display information with little time to adjust the focus.

The use of the HUD makes it possible to display information at a position close to the center of the field of view of the driver and it is expected that the recognition of display information by the driver will be greatly improved. It is considered that the HUD is particularly effective for an aged person with a low visual function.

When information is displayed at the position close to the center of the field of view of the driver, the driver is likely to feel discomfort. Therefore, an information display method that enables the driver to easily recognize information and also prevent the driver from feeling discomfort is needed. A technique has been proposed which displays information in the vicinity of the field of view of the driver (operator) and adds a visual attraction to the display information at a given timing, thereby improving the recognition of the display information (for example, see Non-patent Literature 1).

For example, in Non-patent Literature 1, a motion effect, such as longitudinal vibration or lateral vibration, is added to the display information, thereby obtaining the effect of enabling the driver to easily recognize the display information and preventing the driver from feeling discomfort as the visual attraction. In addition, as an example in which the visual attraction using the vibration is applied during the traveling of the vehicle, Patent Literature 1 discloses a method of improving the recognition of information by the driver using lateral vibration.

Patent Literature 1 discloses a display apparatus and method for a vehicle in which the flow of light with a move speed that is operatively associated with the traveling of the vehicle is generated in the field of view of the driver and a non-display region indicating the existence of another vehicle is provided on the flow. In addition, in Patent Literature 1, when the non-display region is maintained for a predetermined period of time, the non-display region is vibrated in the horizontal direction in order to prevent the driver from being accustomed to the non-display region.

When the HUD is used to display a predetermined image on the windshield so as to be vibrated, the image overlaps the foreground of the vehicle that is changed over time. Therefore, when the display method disclosed in Patent Literature 1 is used, it is possible to display an image such that the driver can easily recognize the displayed image without discomfort.

Specifically, for example, the visual attraction of lateral vibration is added to the image indicating that there is, for example, a pedestrian (attention object) on the path of the vehicle and then the image is displayed on the HUD. In this way, it is possible to reliably notify the driver of the existence of the attention object in a short time.

CITATION LIST

Patent Literature

Patent Literature 1: JP-A-2006-264507

Non Patent Literature

Non-patent Literature 1: Kimuro Shunichi et al., "Adaptive Visual Effect for Multi-display Environment Using Head Pose", Technical report of IEICE, HIP 2006-135, pp. 43 to 48

SUMMARY OF INVENTION

Technical Problem

However, according to the study of the inventors of the present invention, when the image indicating the existence of the attention object is vibrated only in the horizontal direction, it is difficult to display the image such that the driver can easily recognize the image without discomfort under all traveling conditions.

Specifically, while the vehicle turns right or left or is rotated at an intersection, the horizontal direction is a main direction in the optical flow of the foreground of the vehicle and the optical flow is substantially parallel to the vibration direction of the display image. Therefore, it is difficult to obtain a sufficient visual attraction for the driver.

The invention has been made in view of the above-mentioned problems and an object of the invention is to provide an information display apparatus and an information display method capable of displaying information such that the driver can easily recognize the display information without discomfort, regardless of the traveling state of a vehicle.

Solution to Problem

An information display apparatus according to an aspect of the invention is an information display apparatus that is provided in a vehicle including a camera for capturing a foreground image and displays predetermined information, the apparatus including: a display unit that displays the predetermined information while being moved; an optical flow calculating unit that acquires a plurality of foreground images captured by the camera and calculates vector information of an optical flow of a foreground on the basis of the acquired plurality of foreground images; and a motion effect determining unit that acquires the vector information of the optical flow from the optical flow calculating unit and determines a motion effect of the predetermined information on the basis of the acquired vector information of the optical flow.

Advantageous Effects of Invention

According to the information display apparatus and the information display method of the invention, it is possible to display information such that the driver can easily recognize the display information without discomfort, regardless of the traveling state of a vehicle.

BRIEF DESCRIPTION OF DRAWINGS

FIG. 4 is a diagram illustrating an example of a symbol image management table.

FIG. 5 is a diagram illustrating an example of a motion effect determination table.

In FIG. 10, (a) is a diagram illustrating the plane $Z=-f$ and (b) is a diagram illustrating the decomposition of the vector into x and y components.

FIG. 11 is a diagram illustrating an optical flow when a vehicle travels straight. In FIG. 11, (a) is a diagram illustrating an example of the camera image captured by the camera which is provided in the vehicle and the optical flow and (b) is a diagram illustrating the decomposition of the vector of the optical flow into x and y components.

In FIG. 12, (a) is a diagram illustrating an example of the image captured by the camera which is provided in the vehicle and the optical flow and (b) is a diagram illustrating the decomposition of the vector of the optical flow into x and y components.

In FIG. 13, (a) is a diagram illustrating a sine wave, (b) is a diagram illustrating a square wave, (c) is a diagram illustrating a triangular wave, (d) is a diagram illustrating a saw-tooth wave, and (e) is a diagram illustrating a saw-tooth wave.

In FIG. 15, (a) is a diagram illustrating an aspect of the relative movement of the foreground in the coordinate system based on the center of a lens of a virtual camera, (b) is a diagram illustrating an aspect in which the movement of the foreground relative to the virtual camera is decomposed into each component of horizontal movement and rotational motion, and (c) is a diagram illustrating the vector of the optical flow on a projection surface.

FIG. 16 is a diagram illustrating an example of a table for calculating the angle formed between a horizontal component and a vertical component of the vector of the optical flow when a virtual camera is used. In FIG. 16, (a) shows a table in which the speed of the vehicle, the angular velocity of the vehicle, and the angle formed between the horizontal component and the vertical component of the vector of the optical flow are associated with each other and (b) shows a table in which the positional coordinates of an overlap region, the speed of the vehicle, the angular velocity of the vehicle, and the angle formed between the horizontal component and the vertical component of the vector of the optical flow are associated with each other.

FIG. 17 is a diagram illustrating an example of a table for setting the positional coordinates of the overlap region.

In FIG. 19, (a) shows an image including only a symbol image and (b) shows an image including a symbol image and a background image.

In FIG. 21, (a) is a diagram illustrating an example of the enlargement or reduction motion pattern of a sine wave, (b) is a diagram illustrating an example of the enlargement or reduction motion pattern of a wave in which a positive portion of the value of a sine wave is repeated, (c) is a diagram illustrating an example of the enlargement or reduction motion pattern of a square wave, (d) is a diagram illustrating an example of the enlargement or reduction motion pattern of a triangular wave, (e) is a diagram illustrating an example of the enlargement or reduction motion pattern of a sawtooth wave, and (f) is a diagram illustrating an example of the enlargement or reduction motion pattern of a sawtooth wave.

In FIG. 22, (a) is a diagram illustrating an example of the motion pattern in which the symbol image is rotated in the direction of a sine wave, (b) is a diagram illustrating an example of the motion pattern in which the symbol image is rotated in the direction of a square wave, (c) is a diagram illustrating an example of the motion pattern in which the symbol image is rotated in the direction of a triangular wave, (d) is a diagram illustrating an example of the motion pattern in which the symbol image is rotated in the direction of a sawtooth wave, and (e) is a diagram illustrating an example of the motion pattern in which the symbol image is rotated in the direction of a sawtooth wave.

In FIG. 23, (a) to (m) are diagrams illustrating a series of frame images that are changed.

In FIG. 25, (a) is a diagram illustrating the symbol image displayed on a HUD, as viewed from the driver and (b) is a cross-sectional view illustrating a vehicle taken along the horizontal direction.

FIG. 28 is a diagram illustrating an example of object in-vehicle information.

FIG. 29 is a diagram illustrating an example of motion effect condition information.

In FIG. 31, (a) is a diagram illustrating a sine wave, (b) is a diagram illustrating a square wave, (c) is a diagram illustrating a triangular wave, and (d) is a diagram illustrating a sawtooth wave.

In FIG. 34, (a) is a diagram illustrating the positional relationship, as viewed from the upper side and (b) is a diagram illustrating the positional relationship, as viewed from the horizontal direction.

DESCRIPTION OF EMBODIMENTS

Hereinafter, exemplary embodiments of the invention will be described with reference to the accompanying drawings.

First Embodiment

Figure 1:
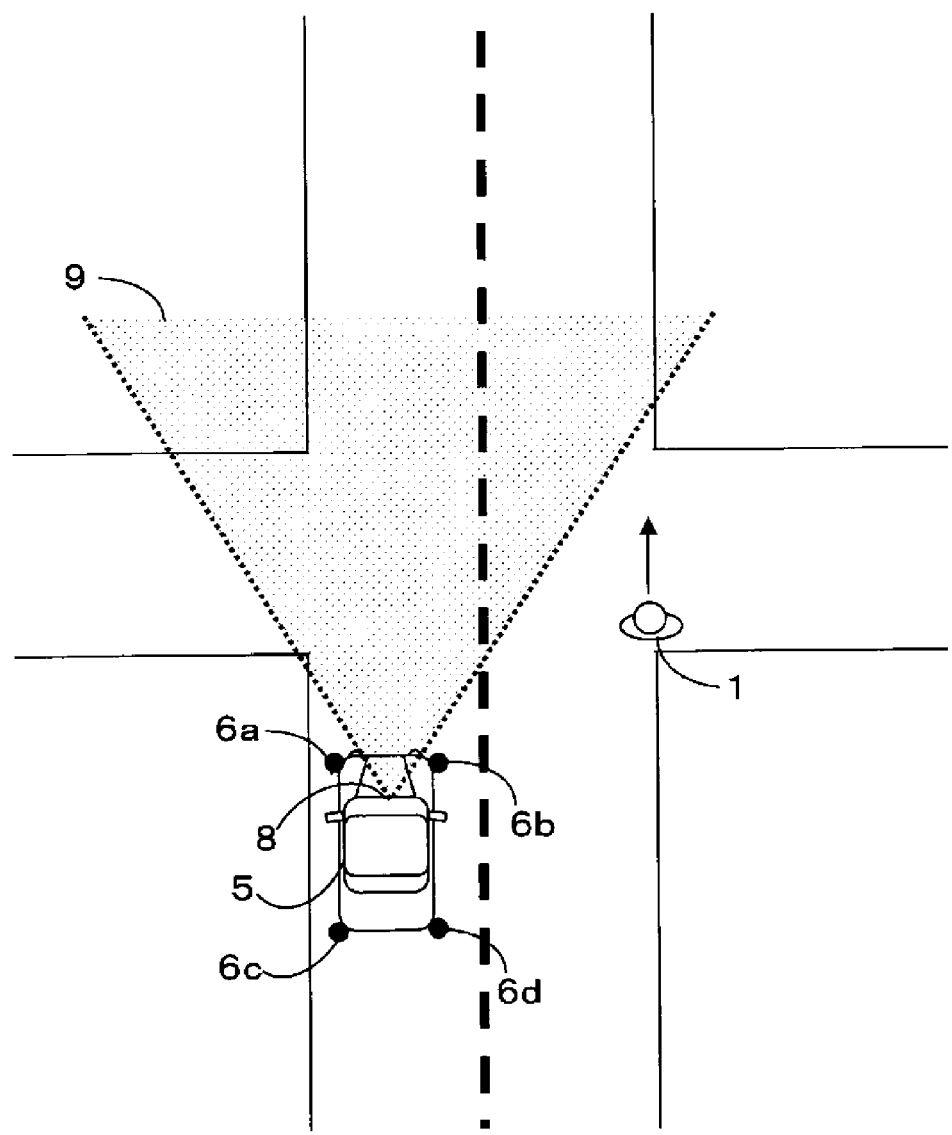
FIG. 1 is a diagram illustrating an aspect of traveling of a vehicle that is provided with an information display system including an information display apparatus according to a first embodiment.
Figure 2:
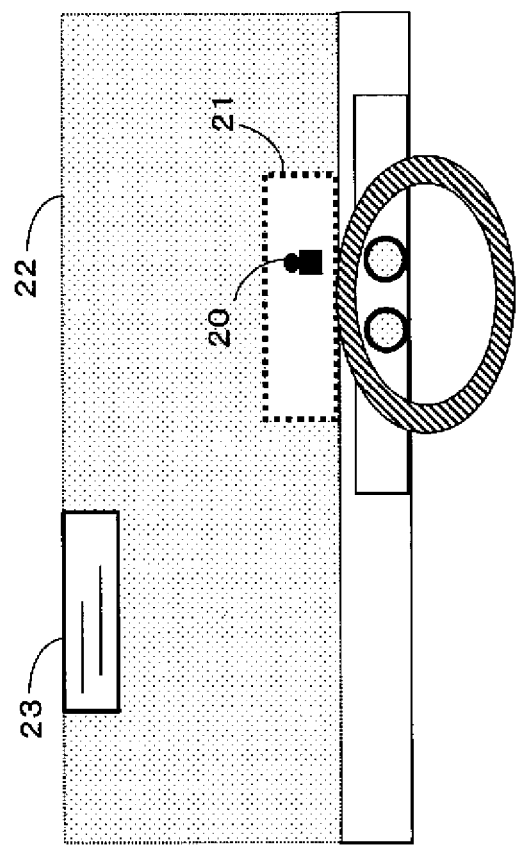
FIG. 2 is a diagram illustrating an aspect in the vicinity of the driver's seat in the vehicle that is provided with the information display system including the information display apparatus according to the first embodiment.

FIG. 1 is a diagram illustrating an aspect of traveling of a vehicle provided with an information display system including an information display apparatus according to a first embodiment. FIG. 2 is a diagram illustrating an aspect in the vicinity of the driver's seat in the vehicle provided with the information display system including the information display apparatus according to the first embodiment. In the following description, it is assumed that the information display system including the information display apparatus is provided in a vehicle, such as a car. In addition, the vehicle is referred to as an "own vehicle 5" and the driver of the own vehicle 5 is referred to as a "driver".

The own vehicle 5 is provided with a sensor unit including one sensor or a plurality of sensors 6a to 6d. In FIG. 1, four sensors are shown, but the number of sensors is not limited to four. The sensors 6a to 6d detect a person or an object in a predetermined detection range 7 around the own vehicle 5. Then, display information is displayed on a display region 21 of an HUD which is provided in the own vehicle 5 on the basis of detection information output from the sensors 6a to 6d.

For example, in FIG. 1, when the sensors 6a to 6d detect a pedestrian 1, a symbol image indicating the pedestrian 1 is selected on the basis of the detection information indicating that the "pedestrian" has been detected. Then, a motion effect is added to the symbol image to generate a display image and the display image is displayed on the display region 21.

As shown in FIG. 1, the own vehicle 5 is provided with a camera 8 (first camera). The camera 8 captures the external environment of the own vehicle 5. In this embodiment, the camera 8 captures the foreground of the own vehicle 5, but the invention is not limited thereto. For example, the camera 8 is provided on the rear side of a room mirror 23 shown in FIG. 2.

As shown in FIG. 1, the camera 8 captures a predetermined imaging range 9 which is determined on the basis of the angle of view of the camera 8 in the foreground of the own vehicle 5 at a predetermined frame rate, thereby capturing a foreground image. The foreground image is used to calculate an optical flow.

Figure 3:
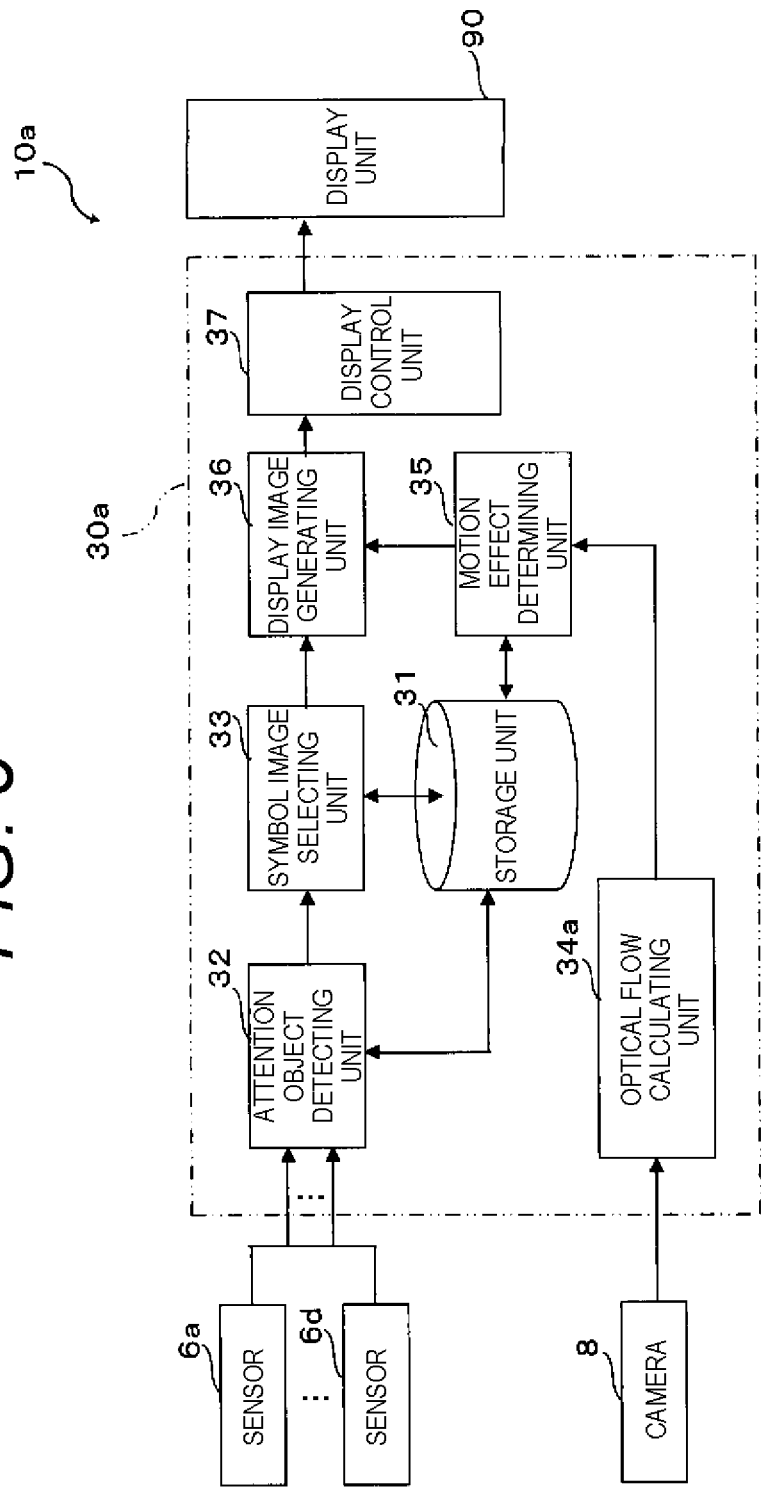
FIG. 3 is a system configuration diagram illustrating the structure of the information display system including the information display apparatus according to the first embodiment.

FIG. 3 is a system configuration diagram illustrating the structure of an information display system 10a including an information display apparatus 30a according to the first embodiment. The information display system 10a according to the first embodiment includes the sensors 6a to 6d, the camera 8, a display unit 90, and the information display apparatus 30a. The information display apparatus 30a is connected to the sensors 6a to 6d and the camera 8. The information display apparatus 30a includes a storage unit 31, an attention object detecting unit 32, a symbol image selecting unit 33, an optical flow calculating unit 34a, a motion effect determining unit 35, a display image generating unit 36, and a display control unit 37.

Figure 7:
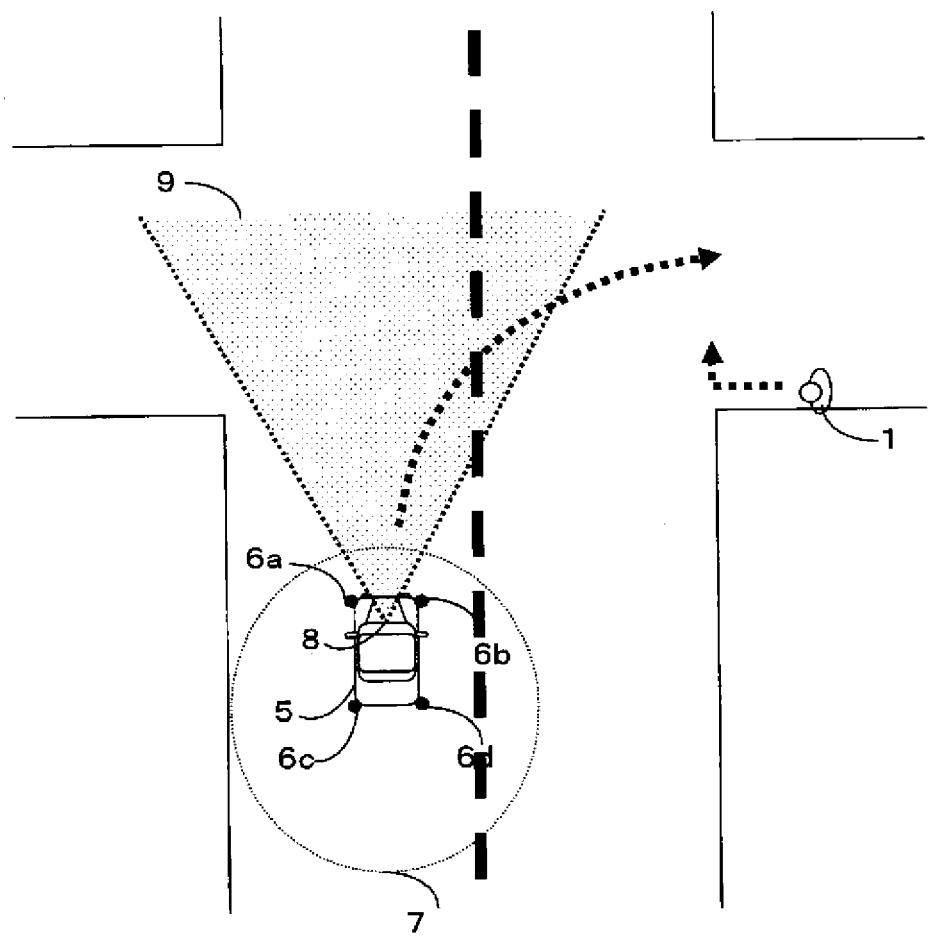
FIG. 7 is a diagram illustrating the positional relationship between the own vehicle and a pedestrian before sensors of the own vehicle according to the first embodiment detect the pedestrian.
Figure 8:
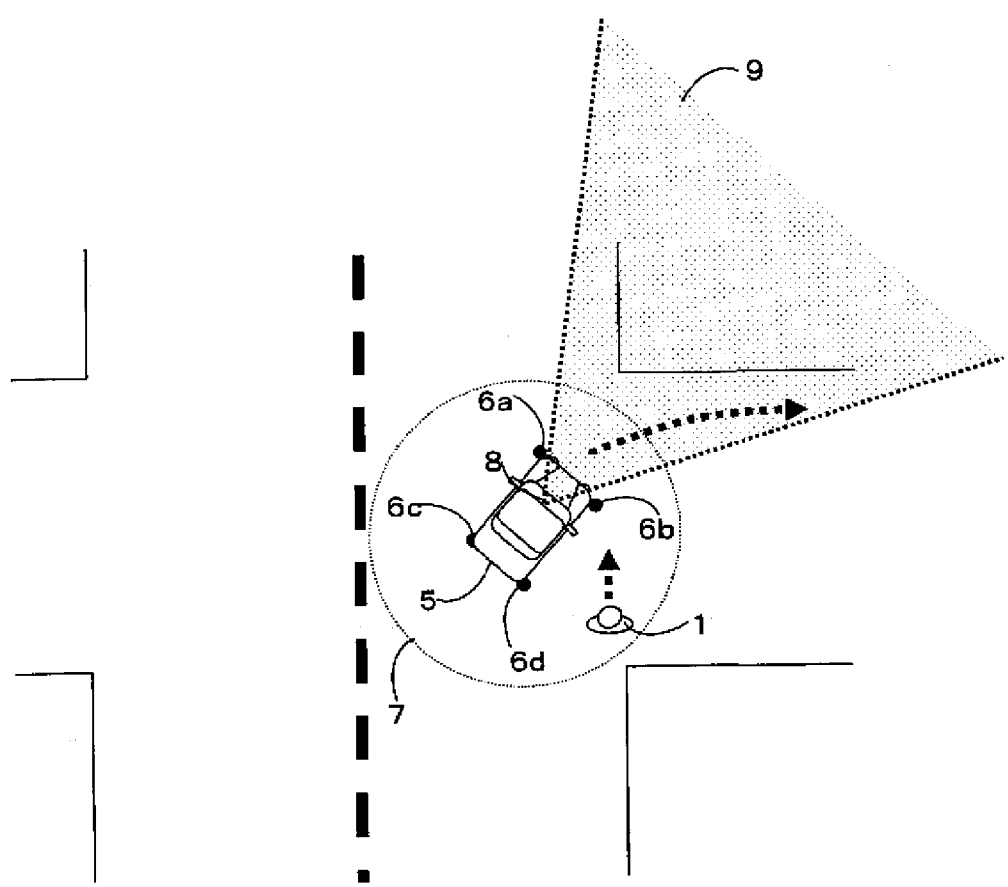
FIG. 8 is a diagram illustrating the positional relationship between the own vehicle and the pedestrian after the sensors of the own vehicle according to the first embodiment detect the pedestrian.

FIG. 7 shows an aspect before the own vehicle 5 turns right and FIG. 8 shows an aspect while the own vehicle 5 is turning right. In FIG. 7, as viewed from the own vehicle 5, the pedestrian 1 enters the predetermined detection range 7 of the sensors 6a to 6d from the outside thereof. The sensors 6a to 6d detect, for example, a person or an object in the predetermined detection range 7 around the own vehicle 5.

Specifically, the sensors 6a to 6d are, for example, imaging devices, radar devices, wireless tag readers, or road-to-vehicle communication devices and may be sensors that detect the kind of object, such as a person or a vehicle or sensors having a function of simply detecting the existence of an object.

When the sensors 6a to 6d detect a detection target, such as a person or an object, in the predetermined detection range 7, they output detection information including information related to the detected person or object to the attention object detecting unit 32.

The camera 8 captures the image of the predetermined imaging range 9 in the foreground of the own vehicle 5. The imaging range 9 is determined by, for example, the performance of the camera 8, such as the angle of view of the camera. The camera 8 outputs the captured foreground image to the optical flow calculating unit 34a.

The display unit 90 is, for example, a display region 21, which is a portion of a windshield 22 of the own vehicle 5. An HUD is used as the display unit 90 of the information display system 10a according to the first embodiment. An image obtained by adding a motion effect to the information which is generated by the information display apparatus 30a and needs to be notified to the driver is displayed on the display unit 90.

In each of the following embodiments, an image that is used to display information on the display unit and to which no motion effect has not been added is referred to as a "symbol image" and an image obtained by adding a motion effect to the symbol image is referred to as a "display image". The symbol image may be predetermined information.

The storage unit 31 stores at least a symbol image selection table 40 including the kind of detection target which needs to be notified to the driver and the symbol image and a motion effect determination table 50 indicating conditions for adding a predetermined motion effect to the symbol image.

FIG. 4 is a diagram illustrating an example of the symbol image selection table 40. FIG. 5 is a diagram illustrating an example of the motion effect determination table. Next, the symbol image selection table 40 will be described with reference to FIG. 4 and the motion effect determination table 50 will be described with reference to FIG. 5.

As shown in FIG. 4, in the symbol image selection table 40, the kind of detection information and the symbol image are associated with each other. For example, the "image of a pedestrian" as the symbol image is allocated to a "pedestrian" which is the kind of detection information. In addition, the "image of a bicycle" as the symbol image is allocated to a "bicycle" which is the kind of detection information. The "image of a vehicle" as the symbol image is allocated to a "vehicle" which is the kind of detection information. However, the content of the symbol image selection table 40 is not limited thereto.

As shown in FIG. 5, in the motion effect determination table 50, an ID for identifying the conditions of the optical flow, the conditions of the optical flow calculated by the optical flow calculating unit 34a, which will be described below, and a motion effect to be added are associated with each other.

For example, an ID "001" of the motion effect determination table 50 indicates that no motion effect is added under an optical flow condition that "the magnitude of the vector of the optical flow is less than a". The parameter $\alpha$ is a predetermined value. In this case, it is not necessary to add a motion effect since it is considered that the own vehicle 5 hardly moves and there is no danger.

An ID "002" of the motion effect determination table 50 indicates that the motion effect of longitudinal vibration is added under an optical flow condition that "the magnitude of the vector of the optical flow is equal to or more than $\alpha$ and the magnitude of a horizontal component of the vector of the optical flow is more than the magnitude of a vertical component of the vector of the optical flow".

An ID "003" of the motion effect determination table 50 indicates that the motion effect of lateral vibration is added under an optical flow condition that "the magnitude of the vector of the optical flow is equal to or more than $\alpha$ and the magnitude of the vertical component of the optical flow is equal to or more than the magnitude of the horizontal component of the optical flow and is equal to or less than a value obtained by adding a parameter $\beta$ to the magnitude of the horizontal component".

An ID "004" of the motion effect determination table 50 indicates that the motion effect of lateral vibration and enlargement is added under an optical flow condition that "a value obtained by adding the parameter $\beta$ to the magnitude of the horizontal component of the optical flow is less than the magnitude of the vertical component of the optical flow".

However, the content of the motion effect determination table 50 is not limited thereto. Default direction and amplitude may be set to the motion effect and a motion may occur in the default direction and with the default amplitude when the magnitude of the vector of the optical flow is equal to or less than a predetermined value.

That is, the motion effect may be a vibration method. The motion effect determining unit 35 determines a method of vibrating predetermined information on the basis of the vector information of the optical flow. In addition, the motion effect may be an expansion and contraction method. The motion effect determining unit 35 determines a method of expanding and contracting predetermined information on the basis of the vector information of the optical flow.

Figure 6:
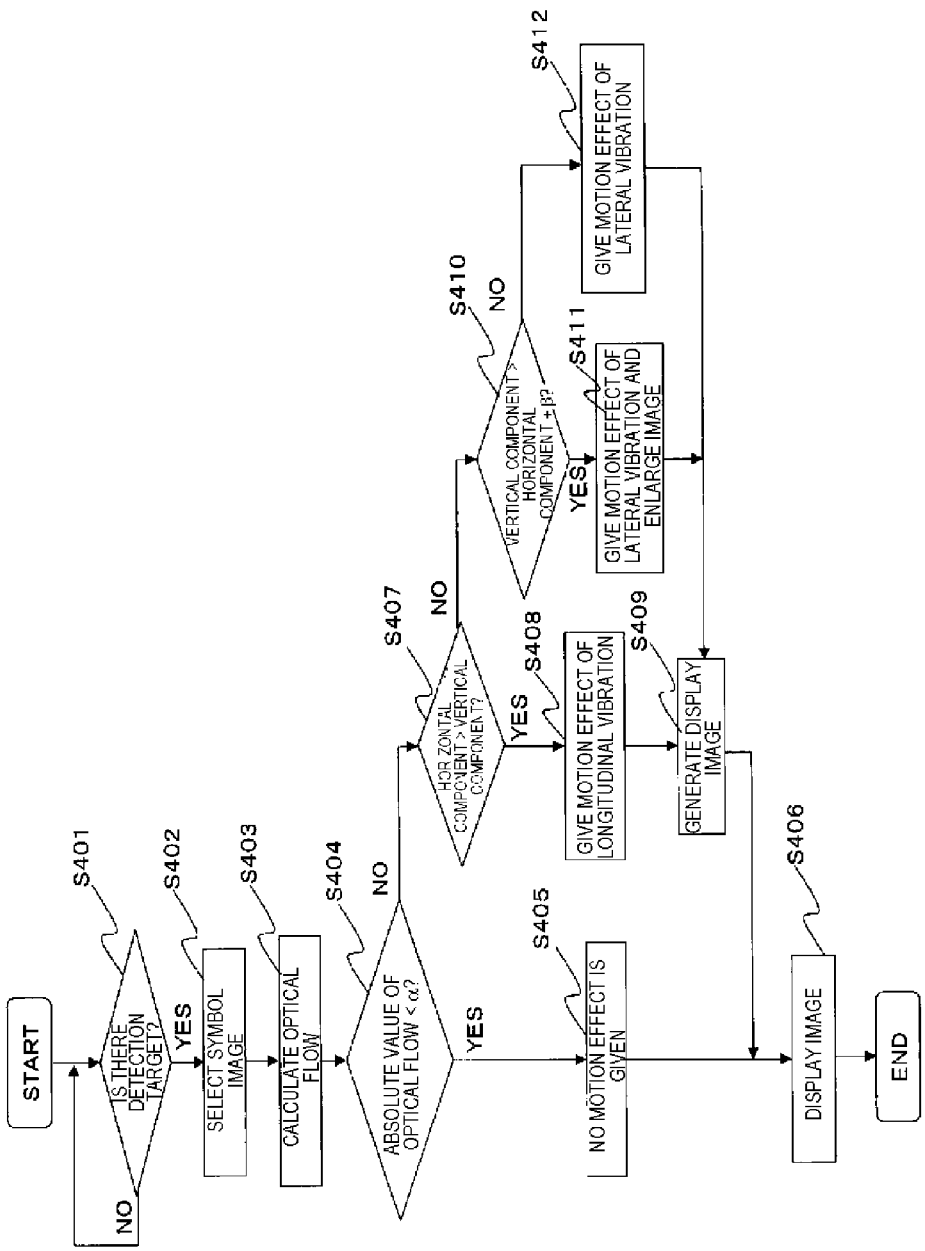
FIG. 6 is a flowchart illustrating the operation of the information display apparatus according to the first embodiment.

Next, the operation of the information display apparatus 30a will be described with reference to FIGS. 6 to 8. FIG. 6 is a flowchart illustrating the operation of the information display apparatus 30a according to the first embodiment. FIG. 7 is a diagram illustrating the positional relationship between the own vehicle 5 and the pedestrian 1 before the sensors 6a to 6d of the own vehicle 5 detect the pedestrian 1.

FIG. 8 is a diagram illustrating the positional relationship between the own vehicle 5 and the pedestrian 1 after the sensors 6a to 6d of the own vehicle 5 detect the pedestrian 1. The sensors 6a to 6d of the own vehicle 5 detect the pedestrian 1

When the sensors 6a to 6d detect, for example, a person or an object in the predetermined detection range 7 around the own vehicle 5, the attention object detecting unit 32 acquires detection information output from each of the sensors 6a to 6d. The attention object detecting unit 32 determines whether the acquired detection information is included in the kind of detection information of the symbol image selection table 40 shown in FIG. 4 (S401).

Specifically, the attention object detecting unit 32 compares the symbol image selection table 40 stored in the storage unit 31 with the detection information acquired from the sensors 6a to 6d and determines whether the detection information is included in the kind of detection information of the symbol image selection table 40 shown in FIG. 4.

When the detection information is included in the kind of detection information (YES of S401), the attention object detecting unit 32 notifies information indicating that the detection information is included in the kind of detection information of the symbol image selection table 40 to the symbol image selecting unit 33.

The symbol image selecting unit 33 acquires the information indicating that the detection information is included in the kind of detection information of the symbol image selection table 40 from the attention object detecting unit 32 and selects a corresponding symbol image (S402). The symbol image selecting unit 33 outputs the selected symbol image to the display image generating unit 36.

Figure 9:
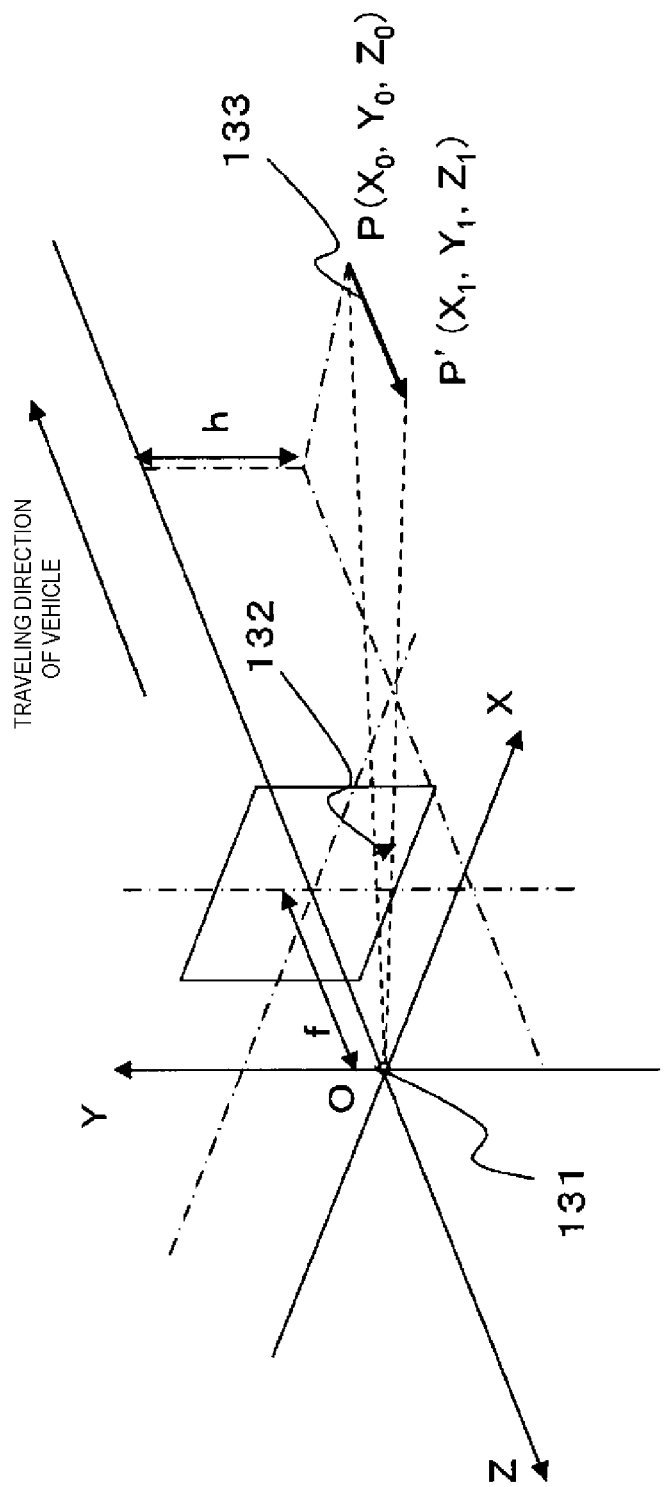
FIG. 9 is a diagram illustrating an aspect of the calculation of an optical flow.

FIG. 9 is a diagram illustrating an aspect of the calculation of the optical flow.

Figure 10:
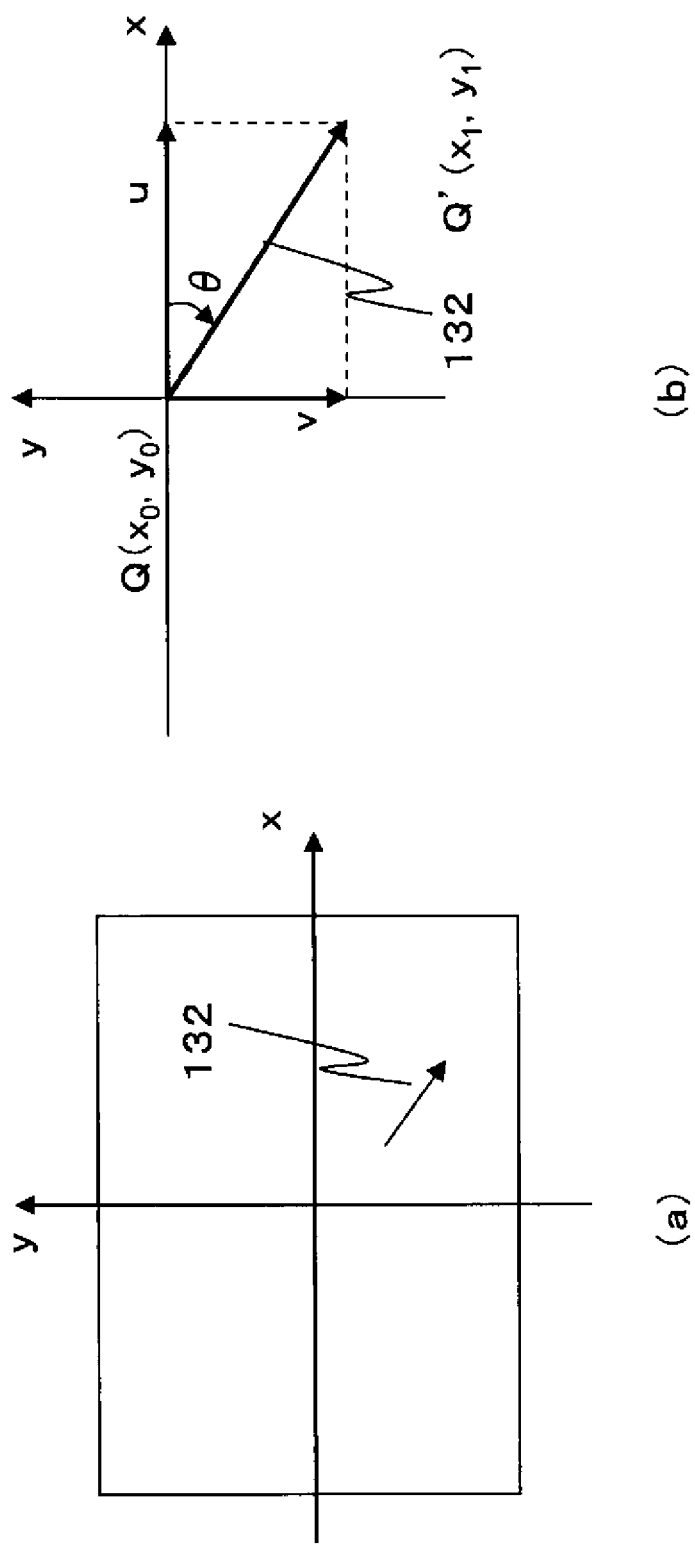
FIG. 10 is a diagram illustrating an aspect in which a vector component of the optical flow in a camera image captured by a camera is projected onto a plane $Z=-f$.

FIG. 10 is a diagram illustrating an aspect in which a vector component of the optical flow in a camera image captured by the camera 8 is projected onto a plane Z=−f. In FIG. 10, (a) is a diagram illustrating the plane Z=−f and (b) is a diagram illustrating the decomposition of the vector into x and y components.

FIG. 11 is a diagram illustrating an optical flow when the vehicle travels straight. In FIG. 11, (a) is a diagram illustrating an example of the camera image captured by the camera 8 which is provided in the vehicle and the optical flow and (b) is a diagram illustrating the decomposition of the vector of the optical flow into x and y components.

Figure 12:
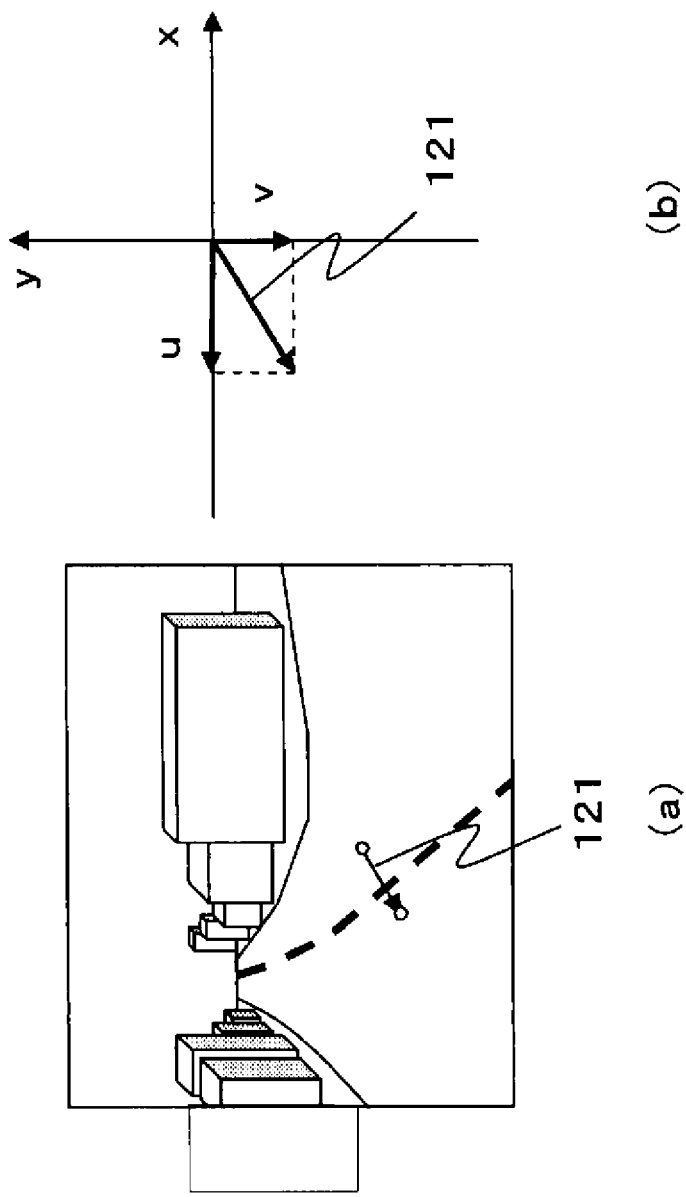
FIG. 12 is a diagram illustrating an optical flow when a vehicle turns right.

FIG. 12 is a diagram illustrating an optical flow when the vehicle turns right. In FIG. 12, (a) is a diagram illustrating an example of the camera image captured by the camera 8 which is provided in the vehicle and the optical flow and (b) is a diagram illustrating the decomposition of the vector of the optical flow into x and y components.

Next, the operation of the optical flow calculating unit 34a will be described with reference to FIGS. 9 to 12.

In this embodiment, the camera 8 constantly captures the predetermined imaging range 9 in the foreground of the own vehicle 5 and outputs the captured foreground image to the optical flow calculating unit 34a. The optical flow calculating unit 34a calculates an optical flow in the image on the basis of a variation in a plurality of foreground images output from the camera 8 over time.

The optical flow calculating unit 34a compares a first foreground image output from the camera 8 with a second foreground image of a frame subsequent to the first foreground image and estimates the corresponding coordinate points therebetween. The corresponding coordinate points are a first coordinate point included in the first foreground image and a second coordinate point indicating background information indicated by the first coordinate point in the second foreground image.

The optical flow calculating unit 34a calculates the difference (motion vector) between the first coordinate point in the first foreground image and the second coordinate point in the second foreground image as the vector of the optical flow (S403). For example, a block matching method is used as a method of estimating the same point between the images.

For example, a gradient method calculates the optical flow on the assumption that the x-axis is the horizontal direction of the foreground image, the y-axis is the horizontal direction of the foreground image, and a position and brightness at the same point on the image are smoothly changed over time.

Specifically, when the brightness of a pixel (x, y) in the foreground image at a time t is E(x, y, t), an x component, which is a horizontal component of the vector of the optical flow in the image, is u, and a y component, which is a vertical component of the vector, is v, the following Expression 1 is established.

$$E(x+u\delta t, y+v\delta t, t+\delta t) = E(x,y,t) \qquad \text{[Expression 1]}$$

Expression 2 is derived from Expression 1 and a least-squares solution of a constraint equation in the vicinity of the pixel (x, y) in the image is calculated as the vector of the optical flow. Expression 2 is a constraint equation.

$$E_x u + E_y v + E_t = 0 \qquad \text{[Expression 2]}$$

The relationship between the actual movement of an object and the optical flow projected onto the image will be described with reference to FIG. 9.

As shown in FIG. 9, as the coordinate system based on the camera 8 facing the traveling direction of the own vehicle 5, the rectangular coordinate system in which the center 131 of a lens of the camera 8 is the origin O, the right side of the own vehicle 5 in the horizontal direction is the X-axis, the upper side of the own vehicle 5 in the vertical direction is the Y-axis, and a direction opposite to the traveling direction is the Z-axis is used.

When the optical axis of the camera 8 is horizontal and overlaps the Z-axis and the focal length of the camera 8 is f, an inverted image is formed on a plane Z=f, which is an actual imaging surface. However, when the inversion of the image is considered, it seems that an image is formed on a plane Z=−f in the forward direction.

When a road surface is the plane and the height of the camera 8 from the load surface is h, the road surface is represented by a plane Y=−h. When a point $P(X_0, Y_0, Z_0)$ on the road surface in the field of view of the camera 8 moves to a point $P'(X_1, Y_1, Z_1)$ in the next frame and these points are respectively projected onto a point $Q(x_0, y_0)$ and a point $Q'(x_1, y_1)$ on a projection surface Z=−f, Expression 3 and Expression 4 are established. This is the same as the projection of the points P' and Q' onto the plane Z=−f.

$$x_0 = -f^* X_0 / Z_0 \qquad \text{[Expression 3]}$$

$$y_0 = -f^* Y_0 / Z_0 = f^* h / Z_0 \qquad \text{[Expression 4]}$$

Therefore, when a vector 132 of the optical flow shown in FIG. 10 is represented by (u, v), Expression 5 and Expression 6 are established and an actual motion vector 133 is projected onto the vector 132 of the optical flow. However, a method of calculating the optical flow is not limited to the above-mentioned method.

$$u = x_1 - x_0 = -f^*(X_1/Z_1 - X_0/Z_0) \qquad \text{[Expression 5]}$$

$$v = y_1 - y_0 = f^* h^* (1/Z_1 - 1/Z_0) \qquad \text{[Expression 6]}$$

The optical flow calculating unit 34a outputs the optical flow calculated by the above-mentioned method to the motion effect determining unit 35. The motion effect determining unit 35 acquires the optical flow output from the optical flow calculating unit 34a. The motion effect determining unit 35 determines a motion effect corresponding to the acquired optical flow with reference to the motion effect determination table 50 stored in the storage unit 31 (S404 to S408 and S410 to S412).

In this embodiment, a representative value of the optical flow of the foreground image captured by the camera 8 may be used as the optical flow output from the optical flow calculating unit 34a.

Since the vector of the optical flow is different at each point on the foreground, the optical flow is vector distribution information. In the calculation of the optical flow, in particular, the optical flow in a region (hereinafter, referred to as an "overlap region") of the foreground which overlaps the display image viewed by the driver is important.

Therefore, the optical flow calculating unit 34a may calculate the optical flow on the basis of only the overlap region in the foreground image. As the representative value of the optical flow, the average of the optical flow of a few points in the overlap region may be used, or the average value of the optical flow of a limited area in the vicinity of a portion of the overlap region in which the display image is actually displayed may be used.

Figure 24:
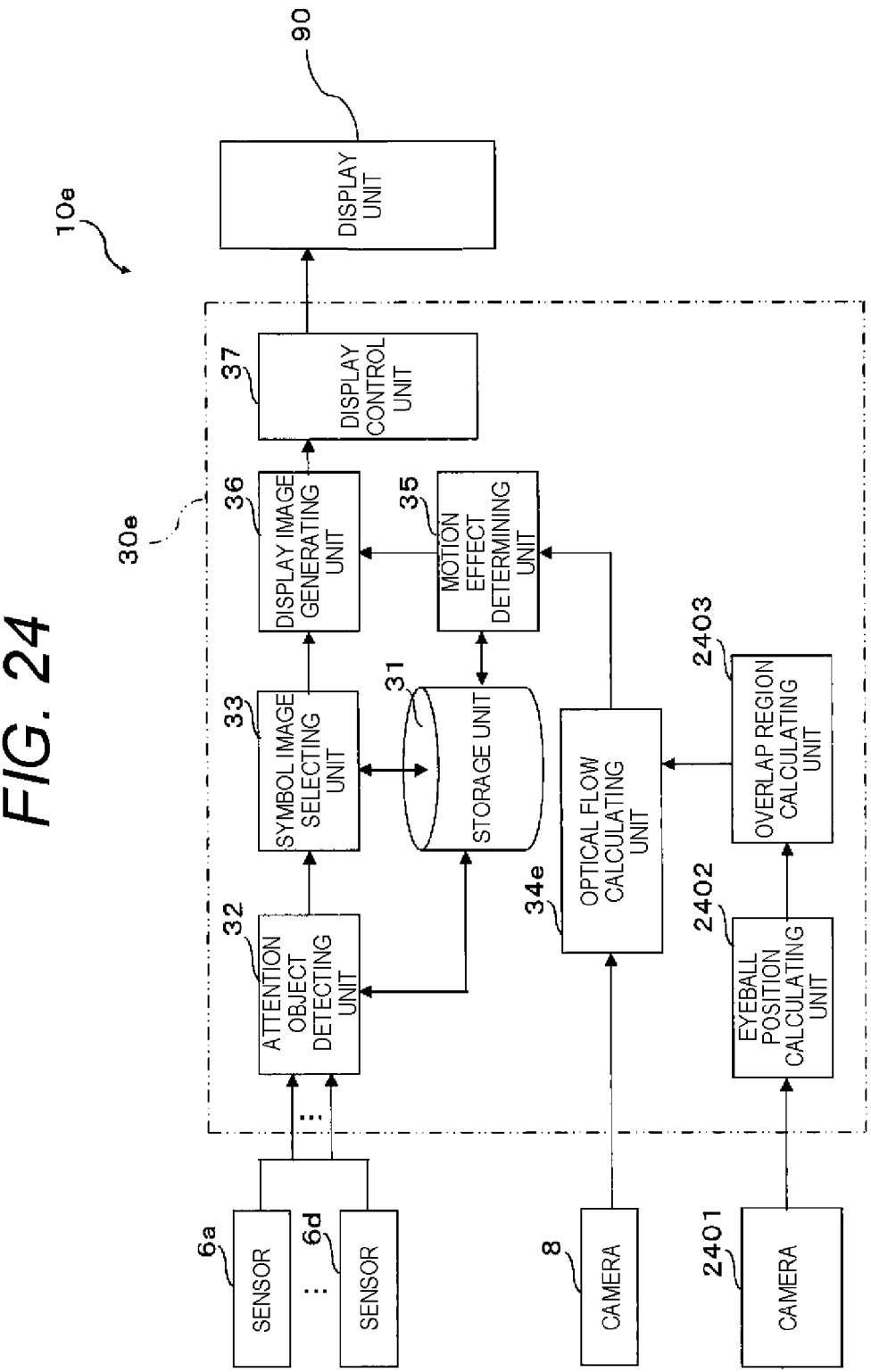
FIG. 24 is a system configuration diagram illustrating the structure of an information display system including an information display apparatus that calculates the vector of an optical flow in the vicinity of an overlap region in a foreground image.

Next, the overlap region will be described. FIG. 24 is a diagram illustrating the structure of an information display system 10e including an information display apparatus 30e that calculates the vector of the optical flow in the vicinity of the overlap region in the windshield 22.

The information display system 10e shown in FIG. 24 includes a camera 2401 (second camera) that captures the image of the face of the driver, an eyeball position calculating unit 2402 that detects the position of the eyeball of the driver from the image acquired from the camera 2401 and calculates the three-dimensional position information of the eyeball of the driver on the basis of installation information indicating the installation position of the camera 2401, and an overlap region calculating unit 2403 that calculates an overlap region on the basis of the calculated position of the eyeball and the display position of a symbol image 20 on the windshield 22.

The installation information indicating the installation position of the camera 2401 is stored in a memory (not shown) included in the information display system 10e.

Figure 25:
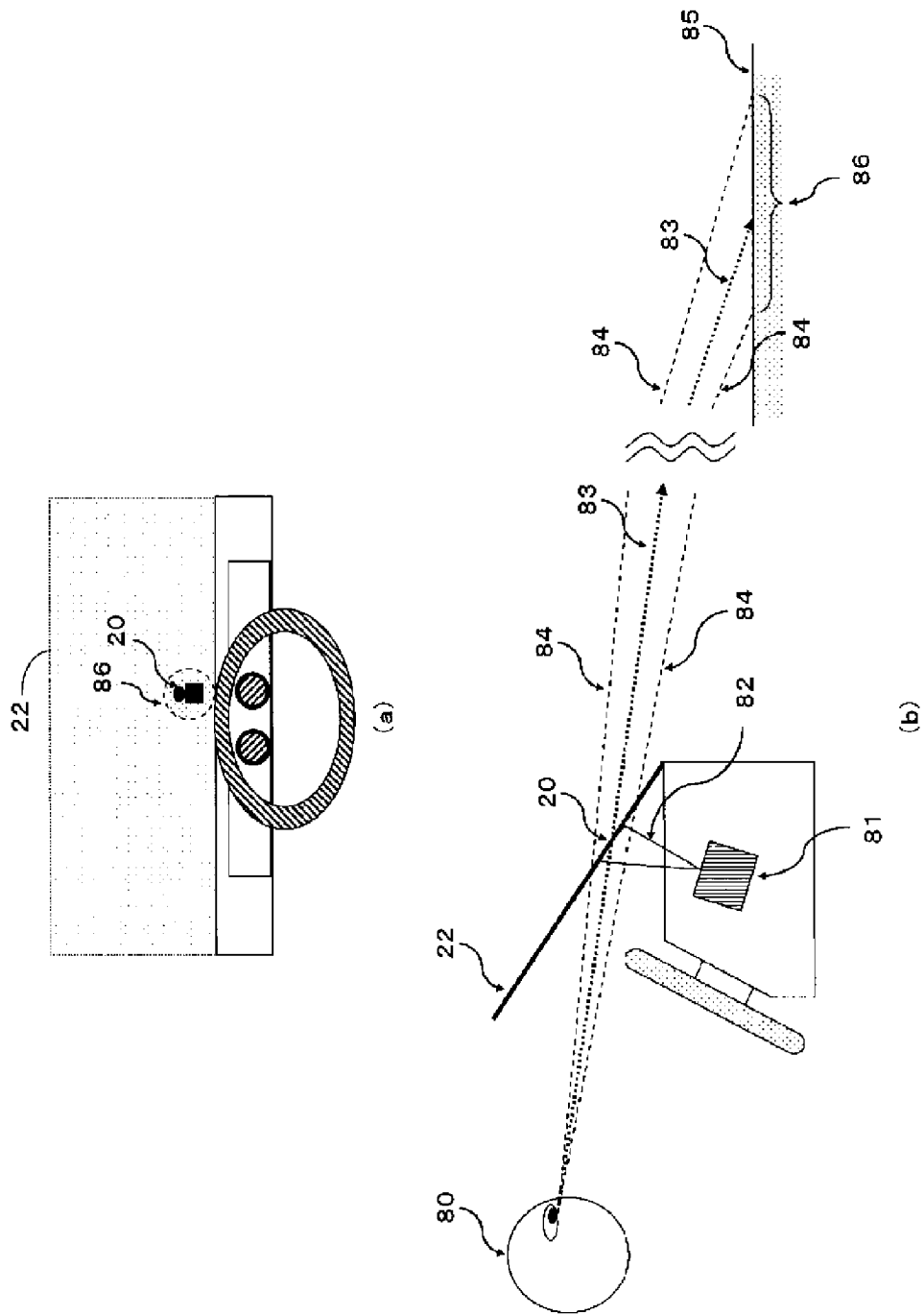
FIG. 25 is a diagram illustrating the positional relationship between the position of the eyeball of the driver and the overlap region.

FIG. 25 is a diagram illustrating the positional relationship between the position of the eyeball of a driver 80 and the overlap region. In FIG. 25, (a) is a diagram illustrating the symbol image displayed on the HUD, as viewed from the driver 80, in which the symbol image 20 is displayed in a lower region of the windshield 22. In the figure, an overlap region 86 is disposed around the symbol image 20.

In FIG. 25, (b) is a cross-sectional view illustrating a vehicle taken along the horizontal direction and corresponds to (a) in FIG. 25. Light 82 emitted from an HUD unit 81 reaches the windshield 22 and reflected light travels toward the driver 80 and is then incident on the eye of the driver 80. In this way, the driver 80 views the symbol image 20. When the driver 80 views the symbol image 20, the line 83 of sight of the driver 80 passes through the symbol image 20.

Since the windshield 22 is transparent, the line 83 of sight of the driver 80 passes through the symbol image 20 and reaches a road surface 85. In (b) of FIG. 25, a region of the road surface 85 which overlaps a predetermined region around the symbol image 20 is the overlap region 86.

That is, the overlap region 86 is a region in which the foreground cut by a straight line 84 linking the position of the eyeball of the driver 80 and a predetermined region including the symbol image 20 in the windshield 22 overlaps the foreground image captured by the camera 8 (first camera).

Next, a method of calculating the optical flow on the basis of the foreground image of the overlap region 86 will be described with reference to FIGS. 24 and 25.

The camera 2401 captures the image of the face of the driver 80 at a predetermined time interval. Image data captured by the camera 2401 is input to the eyeball position calculating unit 2402. The camera 2401 is, for example, a stereo camera and inputs the images which are captured at the same time to the eyeball position calculating unit 2402.

The eyeball position calculating unit 2402 detects the positions of two eyeballs of the driver 80 from the input image. The stereo camera calculates the distance to an object (in this embodiment, the eyeball) using the parallax of the images captured from the positions having a little deviation therebetween on the basis of triangulation. Since the basic distance measurement technique using the stereo camera has been known, it is not described in particular here. In the technique for measuring the distance using the stereo camera, since a person has two eyes, for example, the middle point between the detected positions of the two eyes of the driver 80 may be used as the position of the eyeball.

Figure 34:
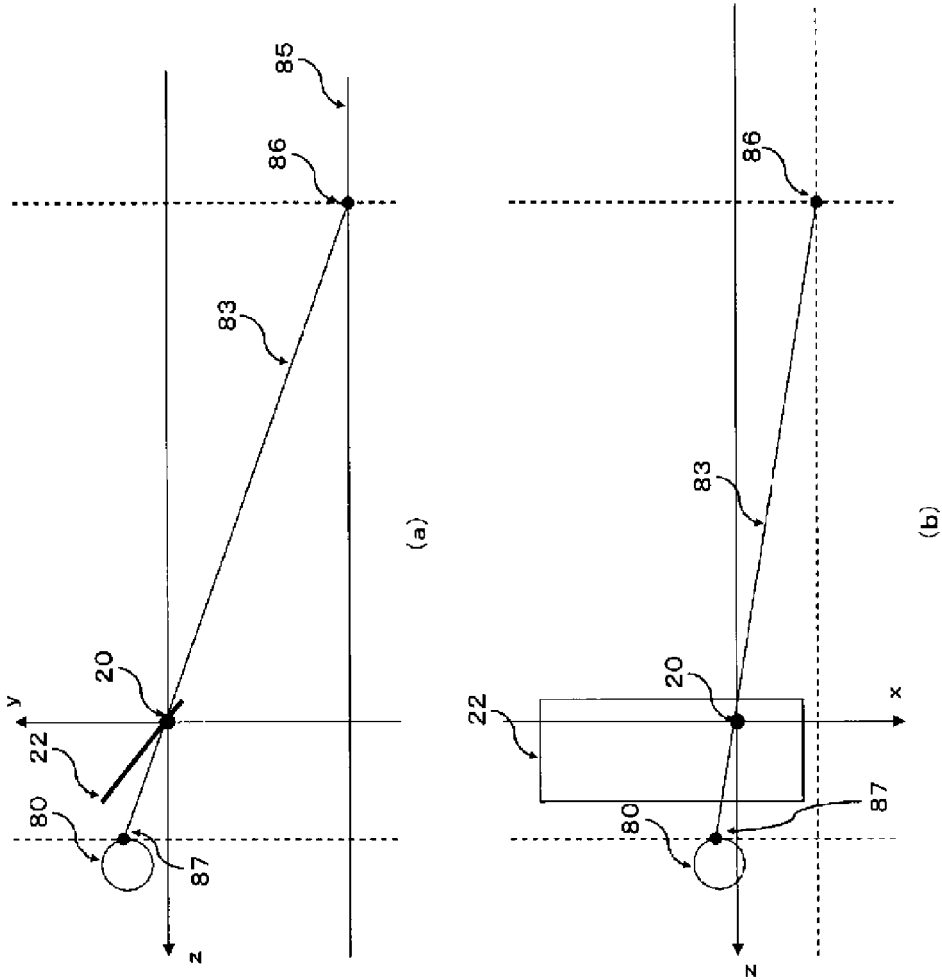
FIG. 34 is a diagram illustrating the positional relationship between the position of the eyeball and an overlap region.

Next, the positional relationship between the position of the eyeball and the overlap region will be described with reference to FIG. 34. FIG. 34 is a diagram illustrating the positional relationship between the position of the eyeball and the overlap region and is a schematic diagram of FIG. 25. In FIG. 34, (a) shows the positional relationship, as viewed from the upper side and (b) shows the positional relationship, as viewed from the horizontal direction. In the coordinate system, the direction of each axis is the same as that in FIG. 9, but the display position of the symbol image 20 is the origin.

In this coordinate system, when the position 87 of the eyeball is ($e_x$, $e_y$, $e_z$) and the overlap region 86 is ($x_c$, $y_c$, h), $x_c$ is represented by Expression 7 and $y_c$ is represented by Expression 8.

$$x_c = \frac{e_x * h}{e_z} \qquad \text{[Expression 7]}$$

$$y_c = \frac{e_y * h}{e_z} \qquad \text{[Expression 8]}$$

Therefore, when the display position of the symbol image 20 and the position 87 of the eyeball are known, it is possible to calculate the position of the overlap region 86. Similarly, the geometric relationship of the display position of the symbol image 20 is stored in advance, which makes it easy to convert the display position into the coordinates in the coordinate system based on the camera 8.

It is possible to calculate the vector of the optical flow using the above-mentioned method by converting $x_c$ and $y_c$ calculated by Expressions 7 and 8 into the coordinate system based on the camera 8. The operation after the vector of the optical flow is calculated is the same as described above and thus a description thereof will be omitted.

As described above, the structure of the system shown in FIG. 24 makes it possible to calculate the vector of the optical flow in the overlap region 86.

The motion effect determining unit 35 may determine the motion effect on the basis of the vector information of the optical flow included in the overlap region 86.

For example, in FIG. 6, when the magnitude of the vector of the optical flow is less than a predetermined value α (for example, α=-2) (NO in S404), for example, when the own vehicle 5 is stopped or when the own vehicle 5 travels at a low speed, the motion effect determining unit 35 considers that there is no optical flow and determines not to give a motion effect to the symbol image selected by the symbol image selecting unit 33 (S405). Therefore, in this case, the symbol image 20 is displayed in the display region of the HUD so as not to move (S406).

The predetermined value is the parameter α in the motion effect determination table 50 shown in FIG. 5.

When the magnitude of the vector of the optical flow is equal to or more than the predetermined value α (NO in S404), the motion effect determining unit 35 performs comparison based on the magnitude of each of the horizontal and vertical components of the optical flow and determines the motion effect according to the comparison result.

For example, when the own vehicle 5 turns right as shown in (a) of FIG. 12, the motion effect determining unit 35 decomposes a vector 111 of the optical flow as shown in (b) of FIG. 12. As a result, the horizontal and vertical components (u, v) are (-10, -2). Then, the motion effect determining unit 35 compares the magnitude of u with the magnitude of v.

In the example shown in (b) of FIG. 12, the magnitude of the horizontal component u of the optical flow as viewed from the driver is more than that of the vertical component v (YES in S407). Therefore, the motion effect determining unit 35 determines to add the motion effect of "longitudinal vibration" to the symbol image with reference to the motion effect determination table 50 shown in FIG. 5 (S408).

In this way, it is possible to display information such that the driver can easily recognize the information without discomfort.

For example, when the own vehicle 5 travels substantially straight as shown in (a) of FIG. 11, the horizontal and vertical components (u, v)=(−3, −20) of a vector 121 of the optical flow are obtained as shown in (b) of FIG. 11. In this example, the motion effect determining unit 35 determines the motion effect on the basis of a predetermined value β. For example, the predetermined value β is −7.

In this case, the magnitude of the vertical component v of the optical flow as viewed from the driver is more than that of the horizontal component u and the difference between the magnitudes is more than 7 (YES in S410). Therefore, the motion effect determining unit 35 determines to add the motion effect of "lateral vibration" to the symbol image 20 with reference to the motion effect determination table 50 shown in FIG. 5 (S411). In this case, a magnification may be set to a fixed value or it may be separately calculated by any method.

In this way, it is possible to display information such that the driver can easily recognize the information without discomfort.

Although not shown in the drawings, when the magnitude of the vertical component v of the vector of the optical flow is more than that of the horizontal component u as shown in (b) of FIG. 11 and the difference therebetween is less than β (NO in S410), the motion effect determining unit 35 gives the motion effect of lateral vibration to the symbol image (S412).

The display image generating unit 36 adds the motion effect determined by the motion effect determining unit 35 to the symbol image selected by the symbol image selecting unit 33 to generate a display image (S409). Then, the display control unit 37 acquires the display image having the motion effect added thereto by the display image generating unit 36 and displays the display image on the display unit 90 (S406).

As described above, examples of the kind of motion effect include one-dimensional vibration in the longitudinal direction, one-dimensional vibration in the lateral direction, enlargement, and reduction. As attributes, such as the amplitude and period of vibration, predetermined values are used, but arbitrary values may be used as the attributes. The kind of motion effect may be a periodic motion.

Figure 13:
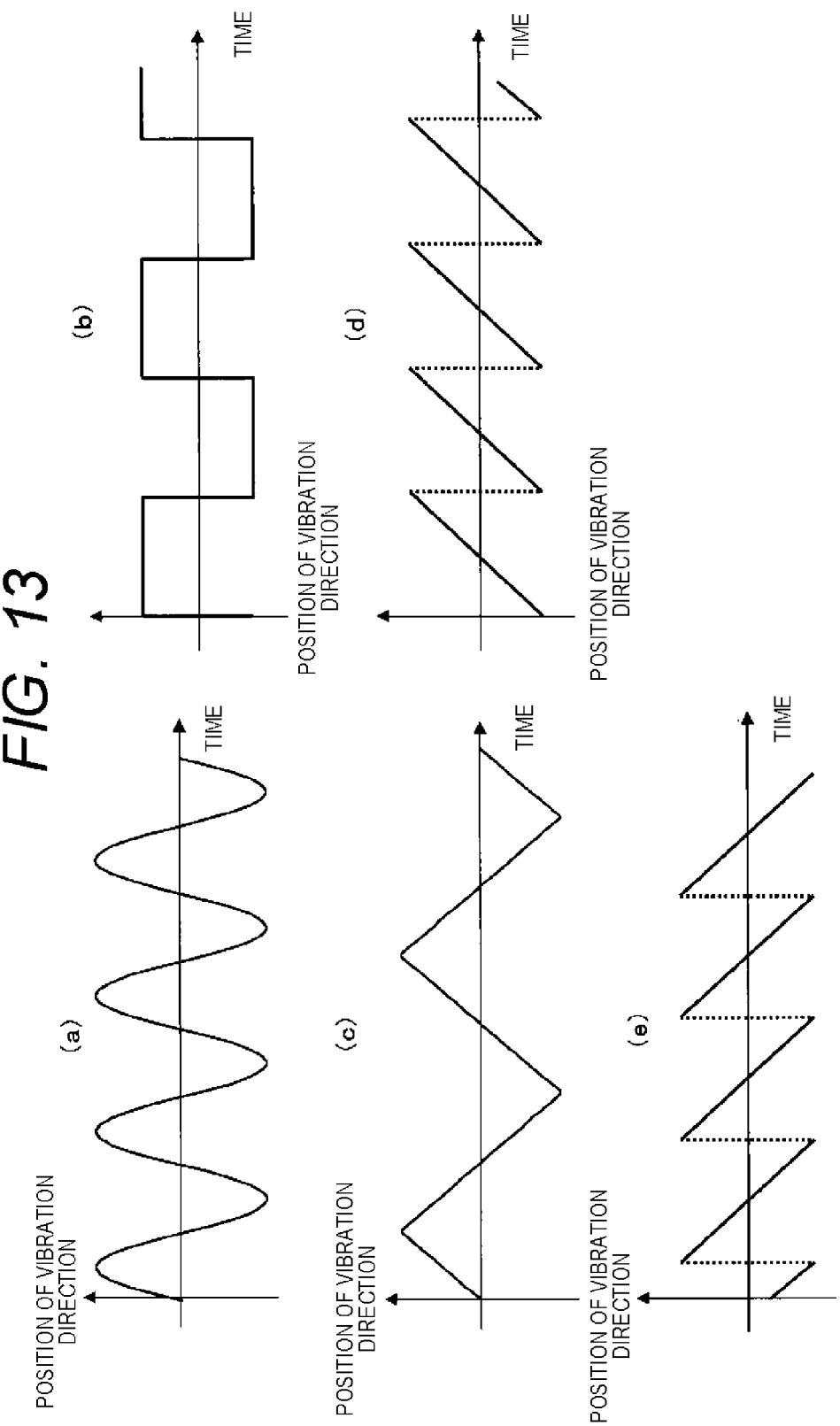
FIG. 13 is diagram illustrating a specific example of a motion effect.

For example, for one-dimensional vibration in the longitudinal or lateral direction, as shown in (a) to (e) of FIG. 13, a position change pattern may be a sine wave, a square wave, or a triangular wave and the display position may be moved in a discontinuous sawtooth wave shape. FIG. 13 is a diagram illustrating an example of the motion effect. In FIG. 13, (a) shows a sine wave. In FIG. 13, (b) shows a square wave. In FIG. 13, (c) shows a triangular wave. In FIG. 13, (d) shows a sawtooth wave. In FIG. 13, (e) shows a sawtooth wave.

Figure 21:
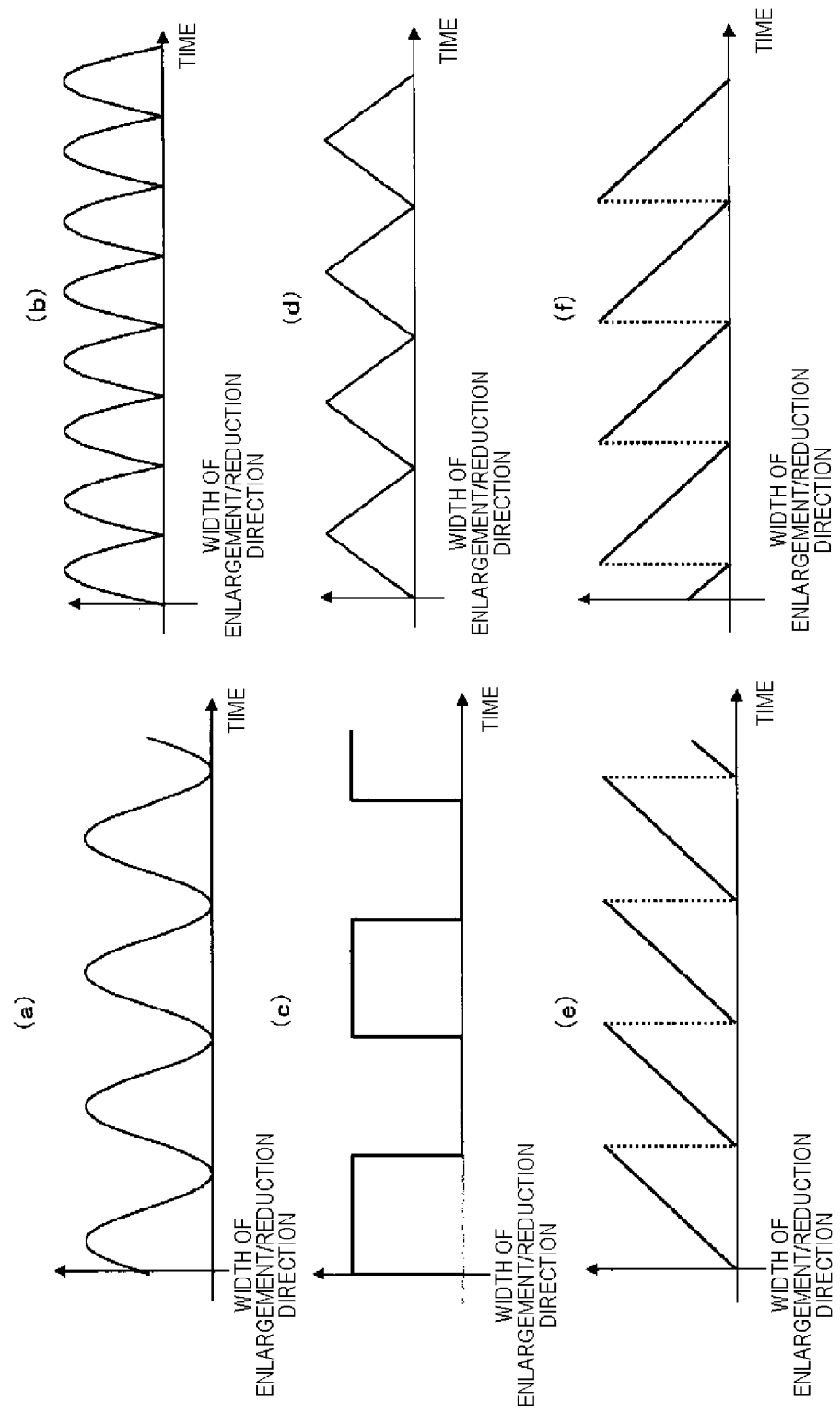
FIG. 21 is a diagram illustrating an example of the enlargement or reduction motion pattern of the symbol image in the longitudinal or lateral direction.

For one-dimensional enlargement or reduction in the longitudinal or lateral direction, as shown in (a) to (f) of FIG. 21, a width in the enlargement and reduction directions is changed in a sine wave shape, a wave shape in which a positive portion of the value of a sine wave is repeated, a square wave shape, a triangular wave shape, or a sawtooth wave shape. FIG. 21 is a diagram illustrating an example of the enlargement or reduction motion pattern of the symbol image 20 in the longitudinal or lateral direction. In FIG. 21, (a) is a diagram illustrating an example of the enlargement or reduction motion pattern of a sine wave. In FIG. 21, (b) is a diagram illustrating an example of the enlargement or reduction motion pattern of a wave in which a positive portion of the value of a sine wave is repeated. In FIG. 21, (c) is a diagram illustrating an example of the enlargement or reduction motion pattern of a square wave. In FIG. 21, (d) is a diagram illustrating an example of the enlargement or reduction motion pattern of a triangular wave. In FIG. 21, (e) is a diagram illustrating an example of the enlargement or reduction motion pattern of a sawtooth wave. In FIG. 21, (f) is a diagram illustrating an example of the enlargement or reduction motion pattern of a sawtooth wave.

Figure 23:
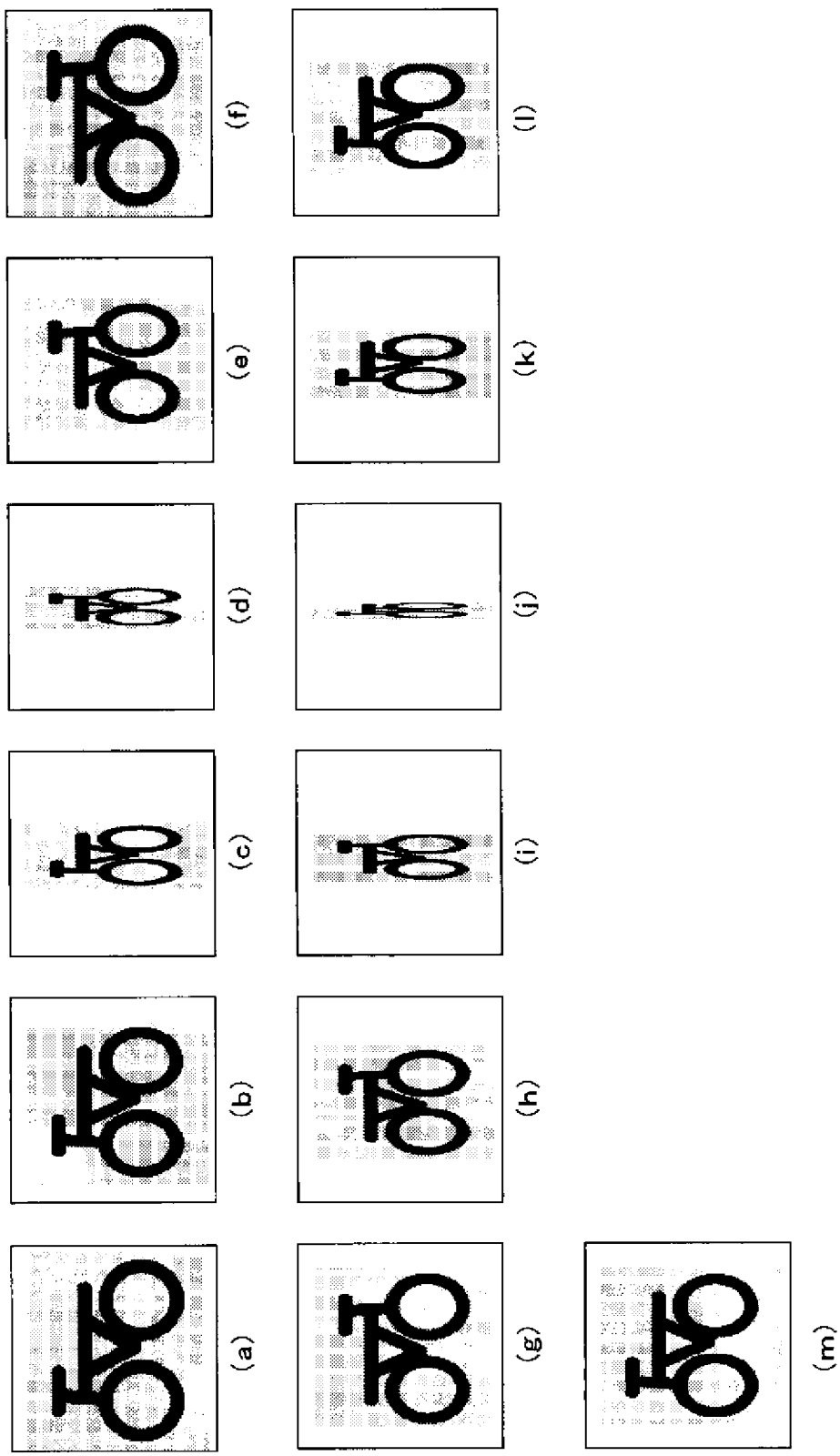
FIG. 23 is a diagram illustrating an example of a change in the image in which a symbol image is viewed as if it is rotated.

As a motion effect similar to enlargement or reduction, there is a display method in which the driver sees an image as if the image is rotated in the longitudinal or lateral direction. Specifically, for example, when an image is changed as shown in (a) to (m) of FIG. 23, it is seen as if the symbol image of a bicycle is rotated about the vertical center line in the horizontal direction. FIG. 23 is a diagram illustrating an example of a change in an image in which a symbol image is viewed as if it is rotated. In FIGS. 23, (a) to 23(m) show a series of frames of images that are changed.

Figure 22:
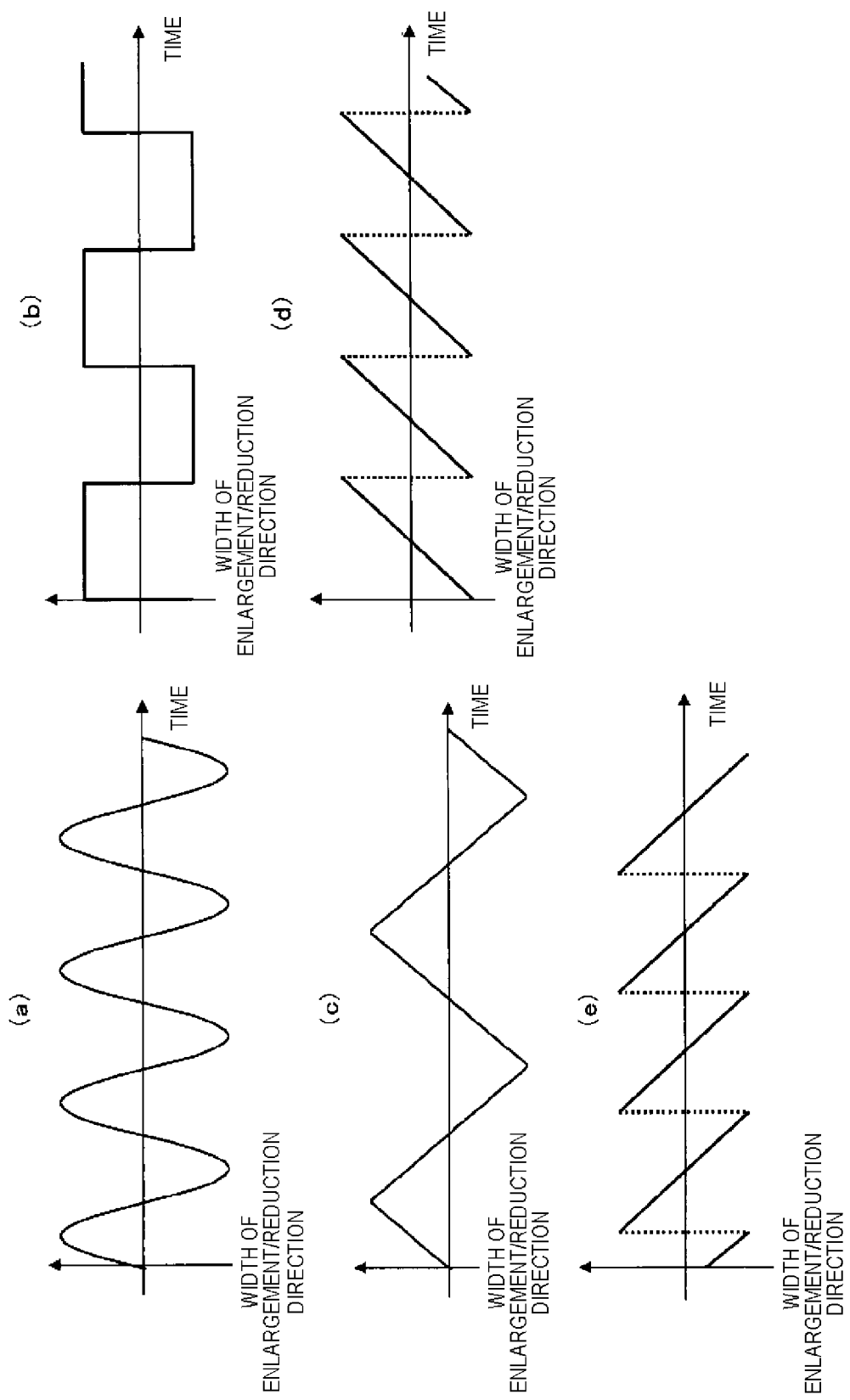
FIG. 22 is a diagram illustrating an example of the longitudinal or lateral motion pattern of an image in which a symbol image is viewed as if it is rotated.

FIG. 22 is a diagram illustrating an example of the longitudinal or lateral motion pattern of an image in which a symbol image is viewed as if it is rotated. In FIG. 22, (a) to (e) are graphs in which the horizontal axis is time, the vertical axis is the width of a display image in the rotation direction and show examples in which the motion pattern is changed, for example, in a sine wave shape, a square wave shape, a triangular wave shape, and a sawtooth wave shape. Specifically, in FIG. 22, (a) is a diagram illustrating an example of the motion pattern in which the symbol image is rotated in the direction of the sine wave. In FIG. 22, (b) is a diagram illustrating an example of the motion pattern in which the symbol image is rotated in the direction of the square wave. In FIG. 22, (c) is a diagram illustrating an example of the motion pattern in which the symbol image is rotated in the direction of the triangular wave. In FIG. 22, (d) is a diagram illustrating an example of the motion pattern in which the symbol image is rotated in the direction of the sawtooth wave. In FIG. 22, (e) is a diagram illustrating an example of the motion pattern in which the symbol image is rotated in the direction of the sawtooth wave. In the graphs, a negative symbol of the vertical axis indicates an inverted display image of the original symbol image.

When the display image of the pedestrian 1 is displayed in the display region 21 in this way, it is easy for the driver to recognize the display image without discomfort even though the pedestrian 1 is not in the field of view of the driver. As a result, it is possible to reduce the time required for an operation for avoiding contact with the pedestrian 1.

Therefore, in the information display apparatus 30a according to the first embodiment, for example, the pedestrian 1 that the driver should pay attention to and is in the predetermined detection range 7 around the own vehicle 5 is detected.

When the detection information corresponds to the kind of detection information in the symbol image management table, the optical flow of the own vehicle 5 is calculated and the motion effect to be added to the symbol image is determined.

The optical flow of the own vehicle 5 is calculated on the basis of the foreground image of the own vehicle 5 captured by the camera 8. The determined motion effect is added to the symbol image and is then displayed as the display image on the display unit 90 of the own vehicle 5.

As described above, the information display apparatus 30a according to the first embodiment is provided in the vehicle provided with the camera 8 that captures a foreground image and displays predetermined information. The information display apparatus 30a includes a display unit that displays the predetermined information while moving the predetermined information, an optical flow calculating unit that calculates the vector information of the optical flow of the foreground on the basis of a plurality of foreground images captured by the camera 8, and a motion effect determining unit that acquires the vector information of the optical flow from the optical flow calculating unit and determines the motion effect of the predetermined information on the basis of the acquired vector information of the optical flow. The information display apparatus can display information without being affected by the traveling state of the vehicle such that the driver can easily recognize the information without discomfort.

In this embodiment, an example in which a person or an object is detected has been described. However, the sensors 6a to 6d may have a function of simply detecting only the existence of an object (the sensors do not detect the kind of object such as a person or a specific object). In this case, the selection process of the symbol image selecting unit may not be performed and the determined image may be displayed.

In this embodiment, an example in which there is a symbol image corresponding to the detected attention object has been described. However, in some cases, there is no symbol image 20 corresponding to the attention object in the symbol image selection table 40. The symbol images corresponding to "others" may be prepared in the symbol image selection table 40 in advance. When an unclear object is detected, "others" may be selected and then a display image may be generated.

In addition, the information display apparatus 30a according to the first embodiment can calculate the optical flow of the foreground of the vehicle on the basis of the foreground image of the vehicle which is continuously captured over time.

The display image is moved in a direction intersecting the main component of the vector of the calculated optical flow. Therefore, the driver can easily recognize the display image. In addition, since the added motion effect is a periodic motion, it is easy to predict the movement trajectory of the display image and it is possible to reduce the time from the recognition of the display image to the understanding of the content of the symbol image.

Furthermore, in this embodiment, the motion effect added to the symbol image is determined on the basis of the difference between the magnitudes of the vertical and horizontal components of the optical flow. However, the motion effect added to the symbol image may be determined on the basis of the ratio of the magnitude of the vertical component to the magnitude of the horizontal component of the optical flow.

Second Embodiment

Figure 14:
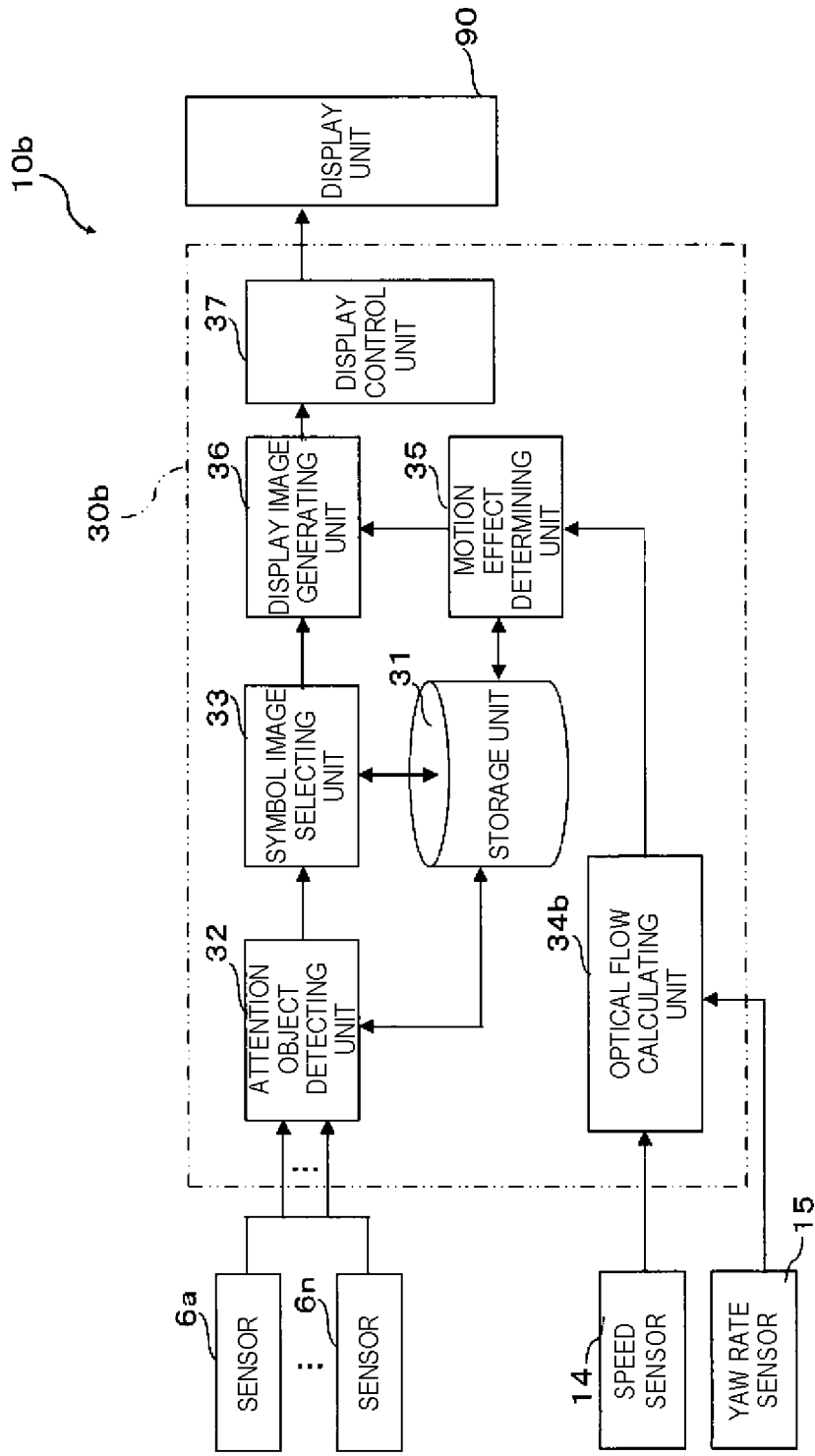
FIG. 14 is a system configuration diagram illustrating the structure of an information display system including an information display apparatus according to a second embodiment.

Next, an information display system including an information display apparatus according to a second embodiment will be described with reference to FIG. 14. FIG. 14 is a system configuration diagram illustrating the structure of an information display system 10b including an information display apparatus 30b according to the second embodiment. In FIG. 14, the same components as those in FIG. 3 are denoted by the same reference numerals.

Hereinafter, in the second embodiment, components different from those in the first embodiment and the operation of the components will be described and a description of the same content as that in the first embodiment will be omitted. The information display system 10b is different from the information display system 10a according to the first embodiment in that, instead of the camera 8, a speed sensor 14 and a yaw rate sensor 15 are connected to the optical flow calculating unit 34b and in an optical flow calculation process of the optical flow calculating unit 34b.

The speed sensor 14 constantly detects the speed of the own vehicle 5 and outputs speed information related to the detected speed to the optical flow calculating unit 34b. The yaw rate sensor 15 constantly detects the rotational speed of the own vehicle 5 and outputs rotational speed information related to the detected rotational speed to the optical flow calculating unit 34b.

Figure 15:
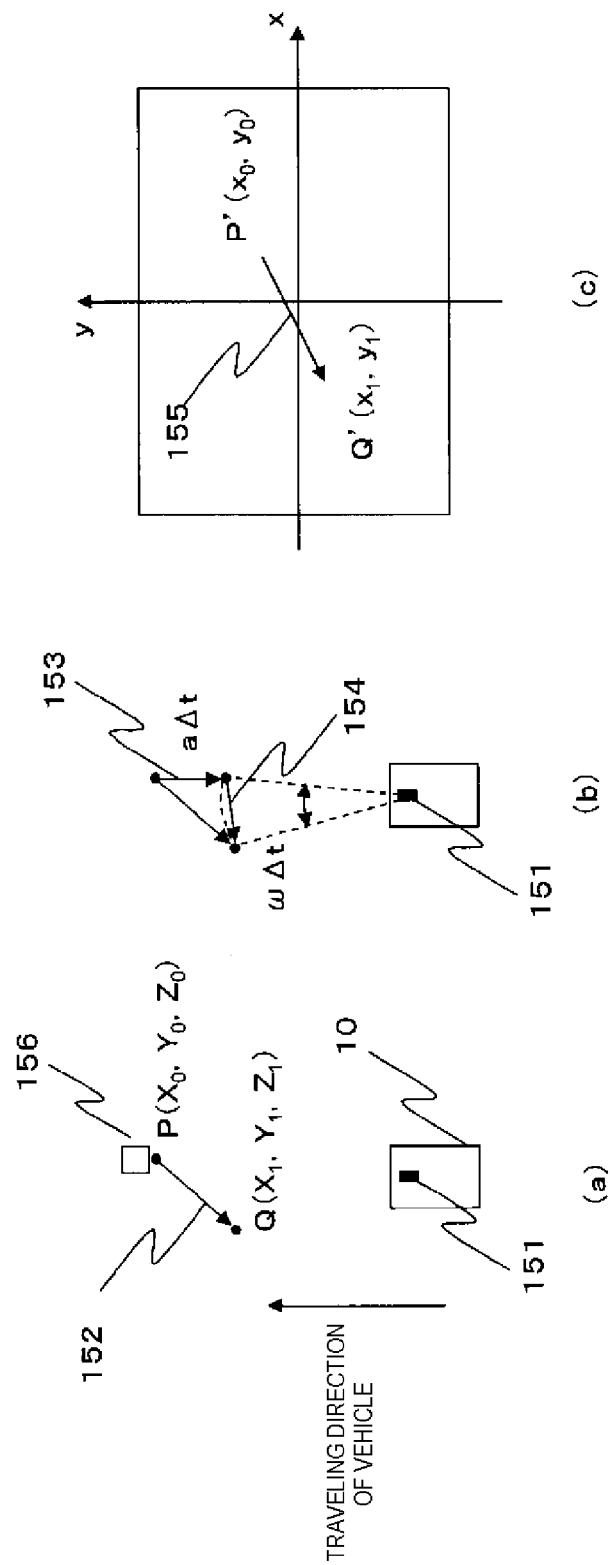
FIG. 15 is a diagram illustrating a process of calculating the vector of an optical flow on the basis of speed information and angular velocity information respectively output from a speed sensor and a yaw rate sensor.

Next, the calculation process of the optical flow calculating unit 34b will be described with reference to FIG. 15. FIG. 15 is a diagram illustrating the process of calculating the optical flow on the basis of the speed information and the rotational speed information output from the speed sensor 14 and the yaw rate sensor 15. Actually, the own vehicle 5 is moved, but it seems to the driver as if the foreground moves. In this embodiment, the coordinate system based on the driver is considered.

In FIG. 15, (a) is a diagram illustrating an aspect of the relative movement of the foreground in the coordinate system based on the center of the lens of a virtual camera. In FIG. 15, (b) is a diagram illustrating an aspect in which the movement of the foreground relative to the virtual camera is decomposed into each component of horizontal movement and rotational motion. In FIG. 15, (c) is a diagram illustrating the vector of the optical flow on a projection surface.

In (a) of FIG. 15, it seems to the driver as if an arbitrary region 156 of the foreground is changed from a point $P(X_0, Y_0, Z_0)$ to a point $Q(X_1, Y_1, Z_1)$. In this case, the movement from the point P to the point Q is represented by a motion vector 152.

In (b) of FIG. 15, a vector 153 is a straight component of a straight motion and a vector 154 is a rotational component of the rotational motion, as viewed from the virtual camera 151.

In (c) of FIG. 15, assuming that the virtual camera 151 captures the motion vector 152 shown in (a) of FIG. 15, a vector 155 is a projected vector of the motion vector 152 onto the image, that is, a vector of the optical flow.

Next, a case in which the arbitrary region 156 of the foreground which is disposed at the coordinates of the point $P(X_0, Y_0, Z_0)$ is moved to the point $Q(X_1, Y_1, Z_1)$ after a predetermined period of time $\Delta t$ during the traveling of the own vehicle 5 as shown in (a) of FIG. 15 will be described.

When the virtual camera 151 which faces the front side in the traveling direction of the own vehicle 5 is considered, the optical flow is calculated on the basis of the image projected onto the imaging surface of the virtual camera 151.

The coordinate system of the virtual camera 151 which is the same as the coordinate system of the first embodiment shown in FIG. 9 is considered, the speed of the own vehicle 5 at the time when the virtual camera 151 captures a given image is referred to as a, and the rotational speed of the own vehicle 5, which is an angular velocity, is referred to as $\omega$.

When the arbitrary region 156 of the foreground which is disposed at a given point $P(X_0, Y_0, Z_0)$ of the foreground of the vehicle is moved to a given point $Q(X_1, Y_1, Z_1)$ after a predetermined period of time $\Delta t$, the motion vector 152 from the point P to the point Q can be considered as the sum of the straight component (vector) 153 of the straight motion shown in FIG. 15(b) and the rotational component (vector) 154 of the rotational motion about the virtual camera 151. Therefore, the relationship between the point P and the point Q may be represented by the following expressions.

$$X_1 = X_0 * \cos(\omega * \Delta t) + (Z_0 + a * \Delta t) * \sin(\omega * \Delta t) \quad \text{[Expression 9]}$$

$$Y_1 = Y_0 \quad \text{[Expression 10]}$$

$$Z_1 = -X_0 * \sin(\omega * \Delta t) + (Z_0 + a * \Delta t) * \cos(\omega * \Delta t) \quad \text{[Expression 11]}$$

When Expression 9 and Expression 11 are substituted into Expression 5 and Expression 9 and Expression 11 are also substituted into Expression 6, it is possible to calculate the vector 155 of the optical flow.

It is possible to determine a motion effect to be added to the symbol image 20 on the basis of the vector 155 of the optical flow calculated in this way, similarly to the first embodiment.

As described above, in the information display apparatus 30b according to the second embodiment, for example, the pedestrian 1, which is an object that the driver should pay attention to, is detected in the predetermined detection range 7 around the own vehicle 5.

When the detection information corresponds to the kind of detection information in the symbol image management table 40, the optical flow of the own vehicle 5 is calculated and the motion effect to be added to the symbol image 20 is determined. The optical flow of the own vehicle 5 is calculated on the basis of the values output from the speed sensor 14 and the yaw rate sensor 15.

The determined motion effect is added to the symbol image 20 and is then displayed as a display image on the display unit 90 of the own vehicle 5.

Therefore, the information display apparatus 30b according to the second embodiment can display information without being affected by the traveling state of the vehicle such that the driver can easily recognize the information without discomfort.

The optical flow of the foreground of the vehicle is calculated on the basis of the speed information and the rotational speed information output from, for example, the speed sensor 14 and the yaw rate sensor 15 provided in the vehicle. Therefore, it is possible to obtain the same effect without using the camera 8.

In addition, since the display image is moved periodically, it is easy for the driver to predict the movement trajectory of the display image. In this way, it is possible to reduce the time from the recognition of the display of the image to the understanding of the content of the symbol image.

Third Embodiment

Next, an information display system including an information display apparatus according to a third embodiment will be described. An aspect of the traveling state of the vehicle provided with an in-vehicle information display system including an in-vehicle information display apparatus which serves as the information display apparatus according to the third embodiment is the same as that shown in FIG. 1 in the first embodiment. The internal structure of the own vehicle 5 provided with the in-vehicle information display system including the in-vehicle information display apparatus is the same as that shown in FIG. 2 in the first embodiment. Therefore, the information display system according to the third embodiment will be described with reference to FIGS. 1 and 2.

The own vehicle 5 is provided with one sensor or a plurality of sensors 6a to 6d. Four sensors 6a to 6d are shown in FIG. 1, but the number of sensors is not limited to four. The sensors 6a to 6d detect a person or an object in a predetermined detection range 7 around the own vehicle 5 and acquire display information generated by the detection. For example, as shown in FIG. 1, the detection information is information indicating the existence of a pedestrian 1. The sensors 6a to 6d output the generated detection information to the in-vehicle information display apparatus.

As shown in FIG. 1, the own vehicle 5 is provided with a camera 8. As shown in FIG. 1, the camera 8 captures the foreground of a predetermined imaging range 9 on the front side in the traveling direction of the own vehicle 5. The camera 8 outputs the captured foreground image to the in-vehicle information display apparatus. In addition, as shown in FIG. 2, a display region 21 serving as a display unit 90 is provided below a windshield 22 and on the lower right side of a room mirror 23 in the own vehicle 5, as viewed from the driver. When the sensors 6a to 6d detect the pedestrian 1, the in-vehicle information display apparatus displays the symbol image 20 of the detected pedestrian 1 as in-vehicle information that needs to be notified to the driver on the display region 21.

Figure 26:
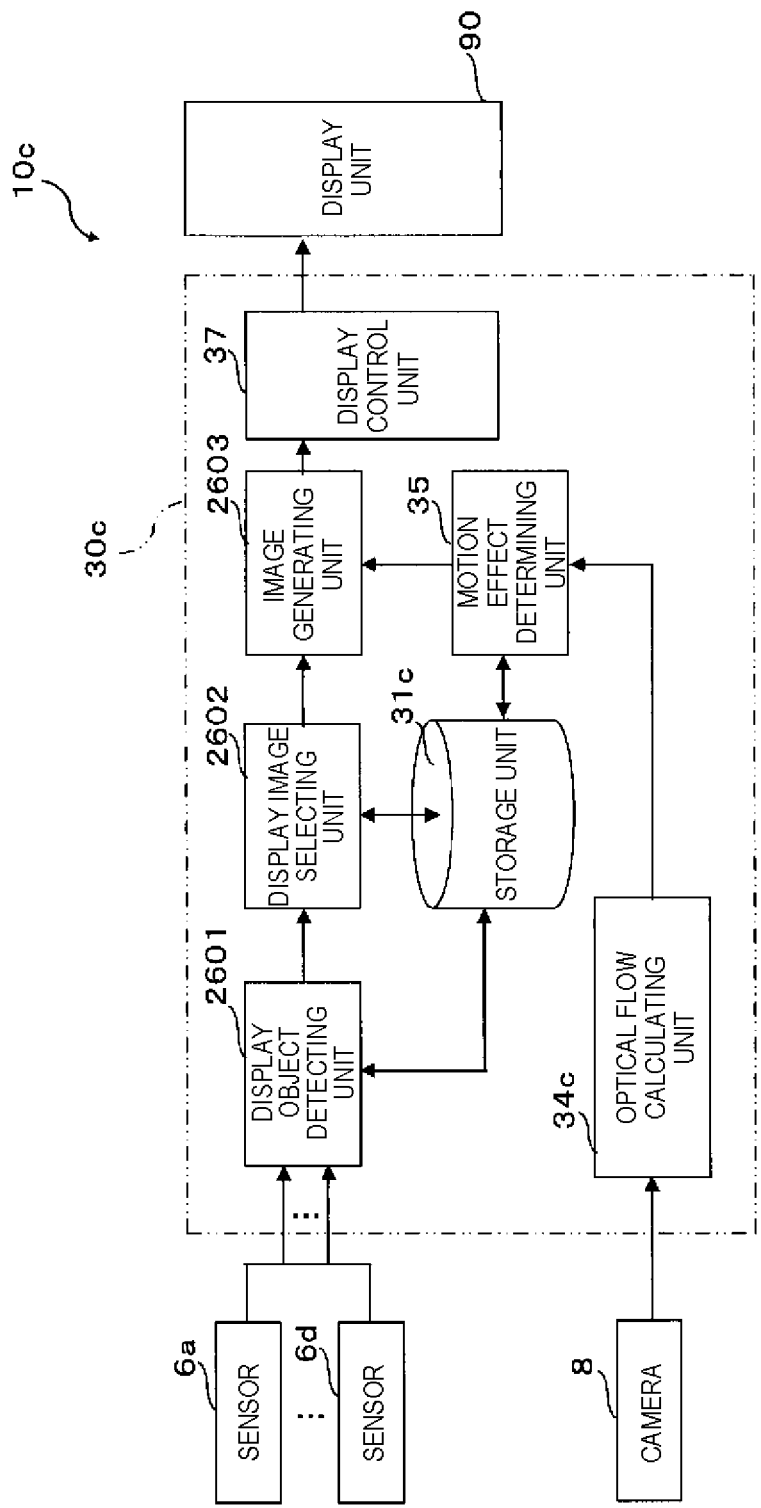
FIG. 26 is a system configuration diagram illustrating the structure of an in-vehicle information display system including an in-vehicle information display apparatus, which is an information display apparatus according to a third embodiment.
Figure 27:
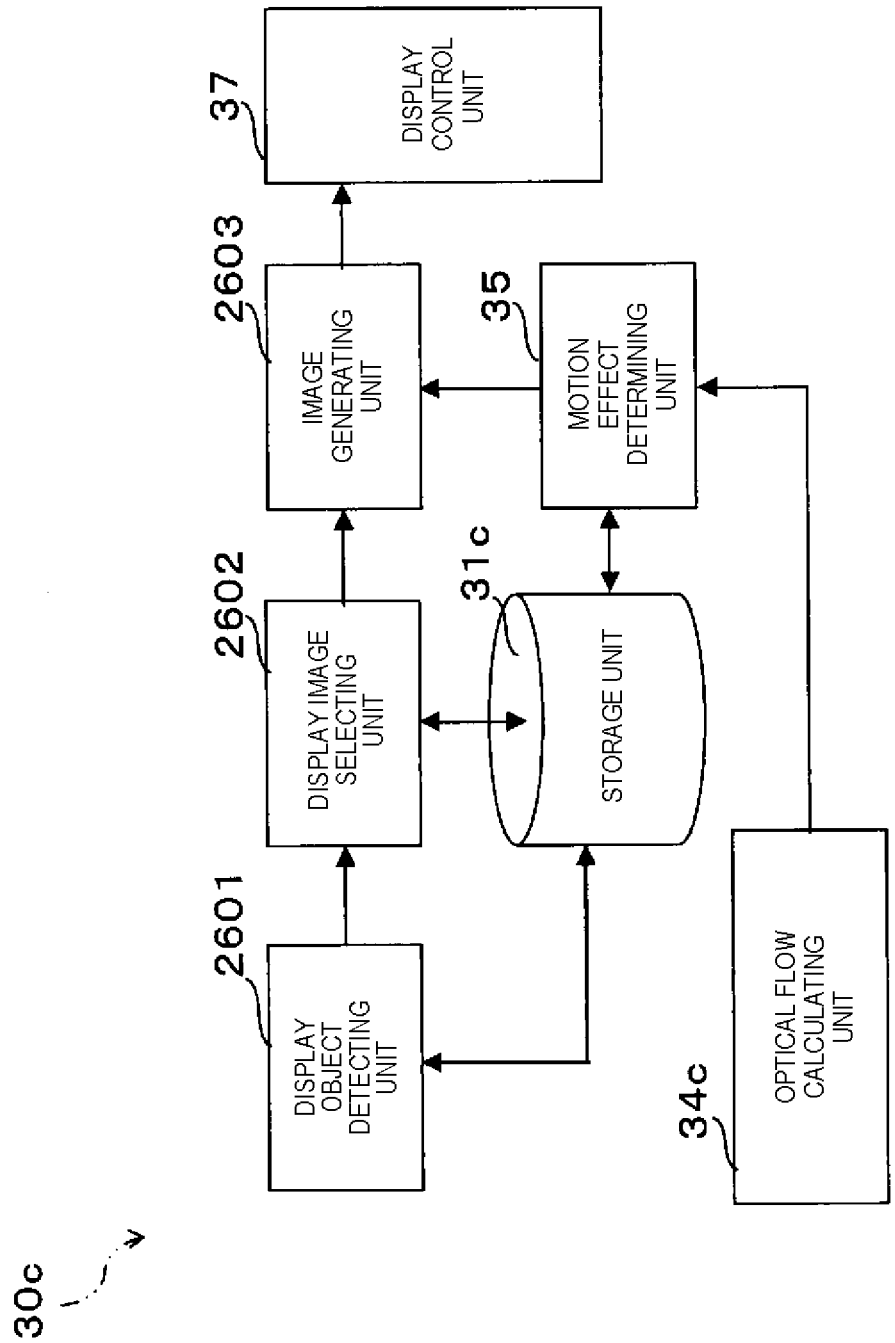
FIG. 27 is a block diagram illustrating the internal structure of the in-vehicle information display apparatus, which is the information display apparatus according to the third embodiment.

FIG. 26 is a system configuration diagram illustrating the structure of an in-vehicle information display system 10c including an in-vehicle information display apparatus 30c, which is the information display apparatus according to the third embodiment. The in-vehicle information display system 10c according to the third embodiment includes the sensors 6a to 6d, the camera 8, the display unit 90, and the in-vehicle information display apparatus 30c. The in-vehicle information display apparatus 30c is connected to the sensors 6a to 6d and the camera 8. FIG. 27 is a block diagram illustrating the internal structure of the in-vehicle information display apparatus 30c, which is the information display apparatus according to the third embodiment. As shown in FIG. 27, the in-vehicle information display apparatus 30c includes a storage unit 31c, a display object detecting unit 2601, a display image selecting unit 2602, an optical flow calculating unit 34c, a motion effect determining unit 35, an image generating unit 2603, and a display control unit 37. The display object detecting unit 2601 corresponds to the attention object detecting unit 32 according to the first embodiment, the display image selecting unit 2602 corresponds to the symbol image selecting unit 33 according to the first embodiment, and the image generating unit 2603 corresponds to the display image generating unit 36 according to the first embodiment.

The sensors 6a to 6d detect whether there is, for example, a person or an object in the predetermined detection range 7 around the own vehicle 5. When the sensors 6a to 6d detect, for example, a person or an object in the predetermined detection range 7, they output detection information including information related to the detected person or object to the display object detecting unit 2601. The camera 8 captures the foreground of the predetermined imaging range 9 on the front side in the traveling direction of the own vehicle 5. The camera 8 outputs the captured foreground image to the optical flow calculating unit 34c. The display unit 90 is, for example, the display region 21, which is a portion of the windshield 22 of the own vehicle 5. An HUD is used as the display unit 90 of the in-vehicle information display system 10c according to the third embodiment. An image, which is information that is generated by the in-vehicle information display apparatus 30c and needs to be notified to the driver of the own vehicle 5 is displayed on the display unit 90. In each of the following embodiments, the information that needs to be notified to the driver of the own vehicle 5 is defined as "in-vehicle information" and an image indicating the in-vehicle information is defined as "in-vehicle information image".

The storage unit 31c stores at least object in-vehicle information 2800 including the kind of in-vehicle information and an image and motion effect condition information 2900 indicating condition information for giving a predetermined motion effect to the in-vehicle information image in this embodiment. The object in-vehicle information 2800 will be described with reference to FIG. 28 and the motion effect condition information 2900 will be described with reference to FIG. 29. FIG. 28 is a diagram illustrating an example of the object in-vehicle information 2800. FIG. 29 is a diagram illustrating an example of the motion effect condition information 2900. The information stored in the storage unit 31c is illustrative, and the same information as that stored in the storage unit 31 according to the first embodiment may be stored in the storage unit 31c. The object in-vehicle information 2800 according to this embodiment corresponds to the symbol image selection table 40 according to the first embodiment and the motion effect condition information 2900 according to this embodiment corresponds to the motion effect determination table 50 according to the first embodiment.

As shown in FIG. 28, the object in-vehicle information 2800 includes an ID for identifying the object in-vehicle information 2800, the kind of object in the object in-vehicle information 2800, and an in-vehicle information image which are associated with each other. For example, in the object in-vehicle information 2800 with an ID "001", the kind of in-vehicle information is a "pedestrian" and the "image of the pedestrian" is allocated as the in-vehicle information image. In the object in-vehicle information 2800 with an ID "002", the kind of in-vehicle information is a "bicycle" and the "image of the bicycle" is allocated as the in-vehicle information image. In the object in-vehicle information 2800 with an ID "003", the kind of in-vehicle information is a "vehicle" and the "image of the vehicle" is allocated as the in-vehicle information image. However, the content of the object in-vehicle information 2800 is not limited to the above.

As shown in FIG. 29, the motion effect condition information 2900 includes an ID for identifying the motion effect condition information 2900, the conditions of the optical flow calculated by the optical flow calculating unit 34c, which will be described below, and a motion effect to be given which are associated with each other. For example, in the motion effect condition information 2900 with an ID "001", when the condition of the optical flow is "the magnitude of the vector of the optical flow<$\alpha$", no motion effect is given. The parameter $\alpha$ is a threshold value for determining whether to give the motion effect. In the motion effect condition information 2900 with an ID "002", when the condition of the optical flow is "the magnitude of a horizontal component of the vector of the optical flow is more than that of a vertical component of the vector of the optical flow", the motion effect of longitudinal vibration is given. In the motion effect condition information 2900 with an ID "003", when the condition of the optical flow is "the magnitude of the horizontal component of the optical flow is equal to or less than that of the vertical component of the optical flow", the motion effect of lateral vibration is given. In the motion effect condition information 2900 with an ID "004", when the condition of the optical flow is "a value obtained by adding a parameter $\beta$ to the magnitude of the horizontal component of the optical flow is less than the magnitude of the vertical component of the optical flow", the motion effect of lateral vibration and enlargement is given. However, the content of the motion effect condition information 2900 is not limited to the above.

Figure 30:
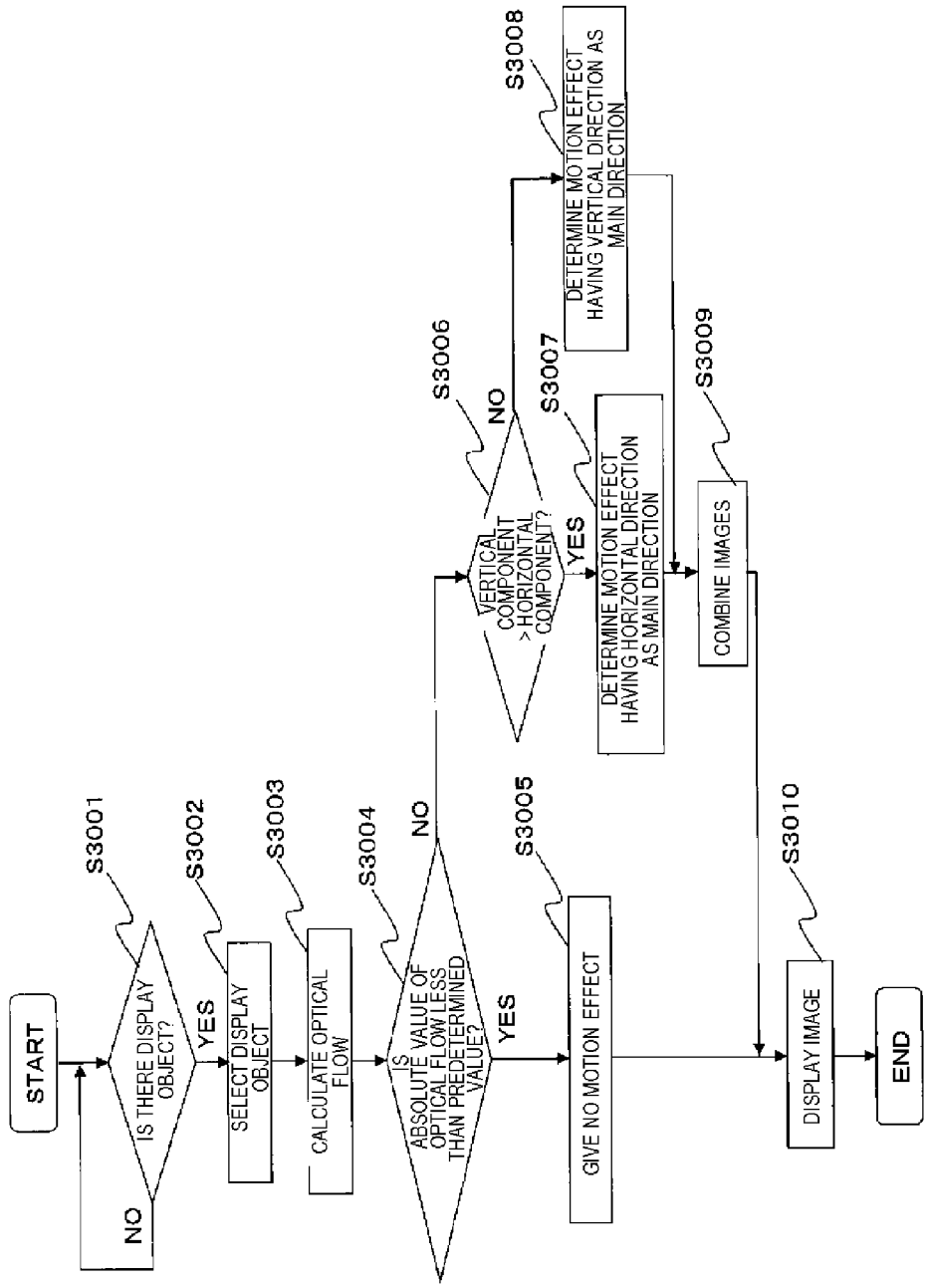
FIG. 30 is a flowchart illustrating the operation of the in-vehicle information display apparatus, which is the information display apparatus according to the third embodiment.

Next, the operation of the in-vehicle information display apparatus 30c will be described with reference to FIGS. 30, 7, and 8. FIG. 30 is a flowchart illustrating the operation of the in-vehicle information display apparatus 30c, which is the information display apparatus according to the third embodiment. FIG. 7 is a diagram illustrating the positional relationship between the own vehicle 5 and the pedestrian 1 before the sensors 6a to 6d of the own vehicle 5 detect the pedestrian 1, as described in the first embodiment. FIG. 8 is a diagram illustrating the positional relationship between the own vehicle 5 and the pedestrian 1 after the sensors 6a to 6d of the own vehicle 5 detect the pedestrian 1, as described in the first embodiment. FIG. 8 shows a state in which the driver is paying attention to the pedestrian 1 approaching the own vehicle 5 that turns right at the intersection. The sensors 6a to 6d of the own vehicle 5 detect the pedestrian 1.

When the sensors 6a to 6d detect, for example, a person or an object in the predetermined detection range 7 around the own vehicle 5, the display object detecting unit 2601 acquires detection information output from each of the sensors 6a to 6d. The display object detecting unit 2601 determines whether the acquired detection information includes the object in-vehicle information 2800 shown in FIG. 28 (S3001). Specifically, the display object detecting unit 2601 compares the object in-vehicle information 2800 stored in the storage unit 31c with the detection information acquired from the sensors 6a to 6d and determines whether the kind of object in the object in-vehicle information 2800 shown in FIG. 28 is included in the detection information. When the kind of object in the object in-vehicle information 2800 is included in the detection information (YES of S3001), the display object detecting unit 2601 outputs information indicating that the kind of object in the object in-vehicle information 2800 is included in the detection information to the display image selecting unit 2602.

The display image selecting unit 2602 acquires the information indicating that the kind of object in the object in-vehicle information 2800 is included in the detection information from the display object detecting unit 2601 and selects an in-vehicle information image corresponding to the kind of object in the object in-vehicle information 2800 which is included in the detection information (S3002). The display image selecting unit 2602 outputs information indicating that the in-vehicle information image has been selected to the image generating unit 2603.

The operation of the optical flow calculating unit 34c is the same as that of the optical flow calculating unit 34a according to the first embodiment. Therefore, the operation of the optical flow calculating unit 34c will be described with reference to FIGS. 9 to 12. FIG. 9 is a diagram illustrating an aspect of the calculation of the optical flow, as described in the first embodiment. FIG. 10 is a diagram illustrating an aspect in which a vector component of the optical flow in a camera image is projected onto a plane Z=−f, as described in the first embodiment. In FIG. 10, (a) is a diagram illustrating the plane Z=−f and (b) is a diagram illustrating the decomposition of the vector into x and y components. FIG. 11 is a diagram illustrating an optical flow when the vehicle travels straight, as described in the first embodiment. In FIG. 11, (a) is a diagram illustrating the image captured by the camera 8 which is provided in the vehicle and (b) is a diagram illustrating the decomposition of the vector based on the optical flow into x and y components. FIG. 12 is a diagram illustrating an optical flow when the vehicle turns right. In FIG. 12, (a) is a diagram illustrating the image captured by the camera 8 which is provided in the vehicle and (b) is a diagram illustrating the decomposition of the vector based on the optical flow into x and y components.

The camera 8 constantly captures the foreground of the predetermined imaging range 9 on the front side in the traveling direction of the own vehicle 5 and outputs the captured foreground image to the optical flow calculating unit 34c. The optical flow calculating unit 34c calculates an optical flow in the image on the basis of a variation in the foreground image output from the camera 8 over time. In the third embodiment, it is assumed that the optical flow of the foreground image captured by the camera 8 is used as a representative value of the optical flow. In addition, the vector of the optical flow is different at each point in the image captured by the camera 8. In particular, the optical flow in the display region 21 of the in-vehicle information image that is viewed by the driver is important. Therefore, as the representative value of the optical flow, the average of the optical flow of a few points in the display region 21 may be used, or the average value of a local optical flow in the vicinity of a portion of the display region 21 in which an image is actually displayed may be used.

The optical flow calculating unit 34c estimates the same point in the image frames of two foreground images output from the camera 8 and calculates the motion vector of the point as the vector of the optical flow (S3003). As a method of estimating the same point between the image frames, for example, a gradient method and a block matching method are used.

For example, the gradient method calculates the optical flow on the assumption that the x-axis is the horizontal direction of the foreground image, the y-axis is the horizontal direction of the foreground image, and a position and brightness at the same point on the image are smoothly changed over time. Specifically, when the brightness of a pixel (x, y) in the foreground image at a time t is $E(x, y, t)$, an x component, which is a horizontal component of the vector of the optical flow in the image, is u, and a y component, which is a vertical component of the vector, is v, Expression 1 described in the first embodiment is established.

A constraint equation, which is Expression 2 described in the first embodiment, is derived from Expression 1 and a least-squares solution is calculated as the vector of the optical flow from the constraint equation in the vicinity of the pixel (x, y) in the image.

The relationship between the actual movement of an object and the optical flow projected onto the image will be described with reference to FIG. 9. As shown in FIG. 9, as a coordinate system based on the camera 8 facing the traveling direction of the own vehicle 5, a rectangular coordinate system in which the center 131 of a lens of the camera 8 is the origin O, the right side of the own vehicle 5 in the horizontal direction is the X-axis, the upper side of the own vehicle 5 in the vertical direction is the Y-axis, and a direction opposite to the traveling direction is the Z-axis. When the optical axis of the camera 8 is horizontal and overlaps the Z-axis and the focal length of the camera 8 is f, an inverted image is formed on the plane Z=f, which is an actual imaging surface. However, when the inversion of the image is considered, it seems that an image is formed on a plane Z=−f in the forward direction. When a road surface is the plane and the height of the camera 8 from the load surface is h, the road surface is represented by a plane Y=−h. When a point $P(X_0, Y_0, Z_0)$ on the road surface in the field of view of the camera 8 moves to a point $P'(X_1, Y_1, Z_1)$ in the next frame and these points are respectively projected onto a point $Q(x_0, y_0)$ and a point $Q'(x_1, y_1)$ on a projection surface Z=−f, Expression 3 and Expression 4 described in the first embodiment are established. This is the same as the projection of the points P' and Q'.

Therefore, when a vector 132 of the optical flow shown in FIG. 10 is represented by (u, v), Expression 5 and Expression 6 described in the first embodiment are established and an actual motion vector 133 is projected onto the vector 132 of the optical flow.

However, a method of calculating the optical flow is not limited to the above-mentioned method.

The optical flow calculating unit 34c outputs the optical flow calculated by the above-mentioned method to the motion effect determining unit 35. The motion effect determining unit 35 acquires the optical flow output from the optical flow calculating unit 34c. The motion effect determining unit 35 sets a motion effect corresponding to the acquired optical flow with reference to the motion effect condition information 2900 which is stored in the storage unit 31c (S3004 to S3008). For example, when the magnitude of the vector of the optical flow is less than a predetermined value α (YES in S3004), such as when the own vehicle 5 is stopped or when the own vehicle 5 travels at a low speed, the motion effect determining unit 35 considers that there is no optical flow and determines not to give a motion effect to the in-vehicle information image selected by the display image selecting unit 2602 (S3005). The predetermined value is the parameter α in the motion effect condition information 2900 shown in FIG. 29.

When the magnitude of the vector of the optical flow is equal to or more than the predetermined value α (NO in S3004), the motion effect determining unit 35 determines a motion effect on the basis of the magnitude of each of the horizontal and vertical components of the optical flow. For example, it is assumed that, when the own vehicle 5 travels substantially straight as shown in (a) of FIG. 11, the horizontal and vertical components (u, v) of the vector 111 of the optical flow are (−3, −20). The motion effect determining unit 35 decomposes the vector 111 of the optical flow into an x-axis component, which is the horizontal component of the image, and a y-axis component, which is the vertical component of the image, and compares the magnitude of the horizontal component with the magnitude of the vertical component, as shown in (b) of FIG. 11.

In the example shown in (b) of FIG. 11, since the magnitude of the vertical component v of the optical flow as viewed from the driver is more than that of the horizontal component u (YES in S3006), the motion effect determining unit 35 determines to give the motion effect of "lateral vibration" to the in-vehicle information image with reference to the motion effect condition information 2900 shown in FIG. 29 (S3007). The motion effect of "lateral vibration" is mainly based on the horizontal component. In addition, when the own vehicle 5 travels as shown in FIG. 11, the in-vehicle information image is displayed substantially in the vertical direction with respect to the optical flow with a vertical component having a large magnitude. Therefore, the motion effect of "lateral vibration" is given to the in-vehicle information image. In this way, it is possible to display the in-vehicle information such that the driver can easily recognize the in-vehicle information without discomfort.

For example, it is assumed that, when the own vehicle 5 turns right as shown in (a) of FIG. 12, the horizontal and vertical components (u, v) of the vector 121 of the optical flow are (−10, 2). In this case, the own vehicle 5 travels close to a turning movement. In this case, since the magnitude of the horizontal component u of the optical flow as viewed from the driver is more than that of the vertical component v (NO in S3006), the motion effect determining unit 35 determines to give the motion effect of "longitudinal vibration" to the in-vehicle information image with reference to the motion effect condition information 2900 shown in FIG. 29 (S3008). The motion effect of "longitudinal vibration" is mainly based on the vertical component. In addition, when the own vehicle 5 travels as shown in FIG. 12, the in-vehicle information image is displayed substantially in the vertical direction with respect to the optical flow with a horizontal component having a large magnitude. Therefore, the motion effect of "longitudinal vibration" is given to the in-vehicle information image. In this way, it is possible to display the in-vehicle information such that the driver can easily recognize the in-vehicle information without discomfort.

The image generating unit 2603 gives the motion effect determined by the motion effect determining unit 35 to the in-vehicle information image selected by the display image selecting unit 2602 to generate an in-vehicle information image (S3009). Then, the image generating unit 2603 outputs the generated in-vehicle information image to the display control unit 37. The display control unit 37 acquires the in-vehicle information image output from the image generating unit 2603 and displays the acquired in-vehicle information image on the display unit 90 (S3010).

Figure 31:
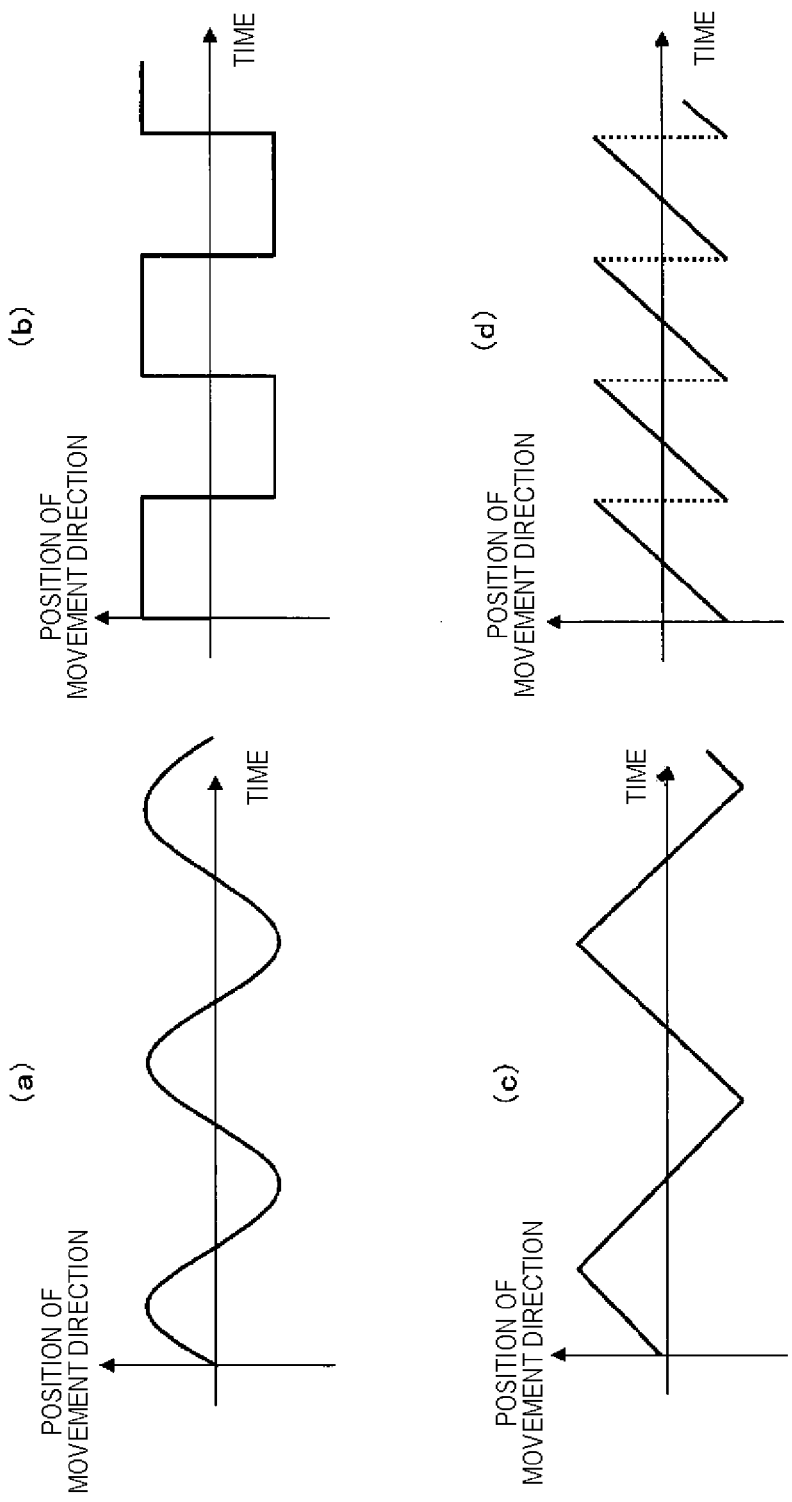
FIG. 31 is a diagram illustrating an example of the motion effect.

As described above, examples of the kind of motion effect include one-dimensional vibration in the longitudinal direction, one-dimensional vibration in the lateral direction, enlargement, and reduction. As attributes, such as the amplitude and period of vibration, predetermined values are used, but arbitrary values may be used as the attributes. The kind of motion effect may be a periodic motion. For example, as shown in (a) to (d) of FIG. 31, a position or shape change pattern may be a sine wave, a square wave, or a triangular wave, and a display position may be moved in a discontinuous sawtooth wave shape. FIG. 31 is a diagram illustrating an example of the motion effect. In FIG. 31, (a) shows a sine wave. In FIG. 31, (b) shows a square wave. In FIG. 31, (c) shows a triangular wave. In FIG. 31, (d) shows a sawtooth wave. In addition, the waveforms shown in (a) to (e) of FIG. 13 in the first embodiment may be used.

When the symbol image 20 of the pedestrian 1 is displayed in the display region 21 in this way, it is easy for the driver of the own vehicle 5 to recognize the display without discomfort even though the pedestrian 1 is not in the field of view of the driver. As a result, it is possible to reduce the time required for an operation for avoiding contact with the pedestrian 1.

As described above, in the in-vehicle information display apparatus 30c, which is the information display apparatus according to the third embodiment, the pedestrian 1, which is an object of the in-vehicle information image, is detected in the predetermined detection range 7 around the own vehicle 5. When an object of the in-vehicle information image is included in the detection information generated by the detection, the optical flow of the own vehicle 5 is calculated and the motion effect to be added to the in-vehicle information image is determined. The optical flow of the own vehicle 5 is calculated on the basis of the foreground image in the traveling direction of the own vehicle 5 which is captured by the camera 8. The in-vehicle information image having the determined motion effect added thereto is displayed on the display unit 90 of the own vehicle 5.

Therefore, the in-vehicle information display apparatus 30c, which is the information display apparatus according to the third embodiment, can display the in-vehicle information without being affected by the traveling state of the vehicle such that the driver can easily recognize the in-vehicle information without discomfort. In addition, the in-vehicle information display apparatus 30c according to the third embodiment can determine whether an object of the in-vehicle information which needs to be notified to the driver is detected around the vehicle with high accuracy on the basis of predetermined object in-vehicle information 2800. The in-vehicle information display apparatus 30c according to the third embodiment can determine whether the vehicle travels straight or the vehicle turns or rotates with high accuracy on the basis of the magnitudes of the horizontal and vertical components of the calculated optical flow. The in-vehicle information display apparatus 30c according to the third embodiment can calculate the optical flow in the traveling direction of the vehicle on the basis of the images which are continuously captured in the traveling direction of the vehicle. In addition, since the motion effect is a periodic motion, it is easy to predict the display trajectory of the in-vehicle information image and the driver can easily recognize the display and understand the content of the displayed image. Since the in-vehicle information image is periodically moved in a direction intersecting the main component of the vector of the calculated optical flow, it is easy for the driver to predict the display trajectory of the in-vehicle information image and the driver can easily recognize the displayed image and understand the content of the displayed image. In addition, since the in-vehicle information image is periodically moved in the direction intersecting the main component of the vector of the calculated optical flow, the driver can reduce the amount of movement of the line of sight after recognizing the displayed in-vehicle information image and easily understand the content of the displayed image.

Fourth Embodiment

Figure 32:
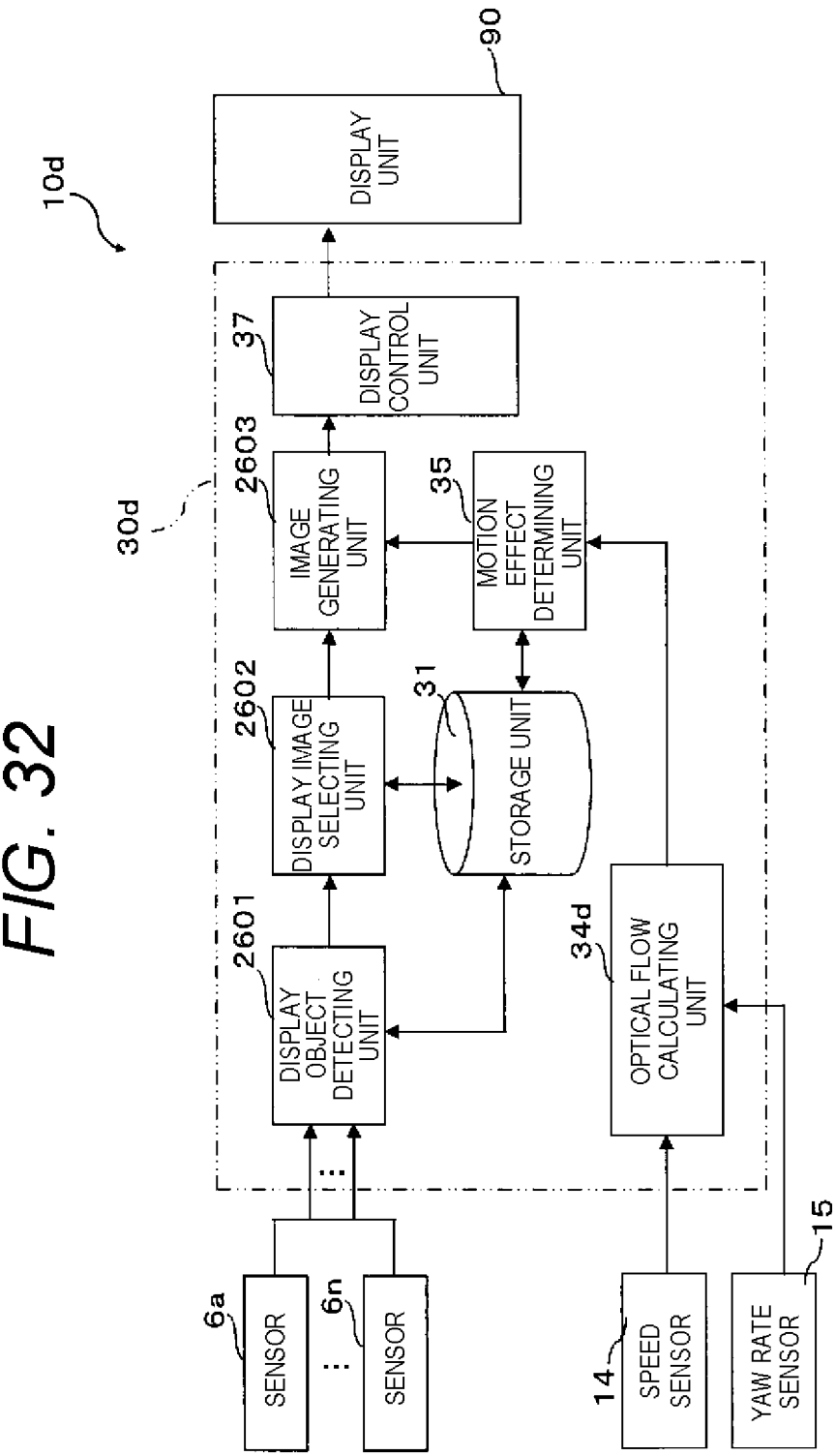
FIG. 32 is a system configuration diagram illustrating the structure of an information display system including an in-vehicle information display apparatus, which is an information display apparatus according to a fourth embodiment.
Figure 33:
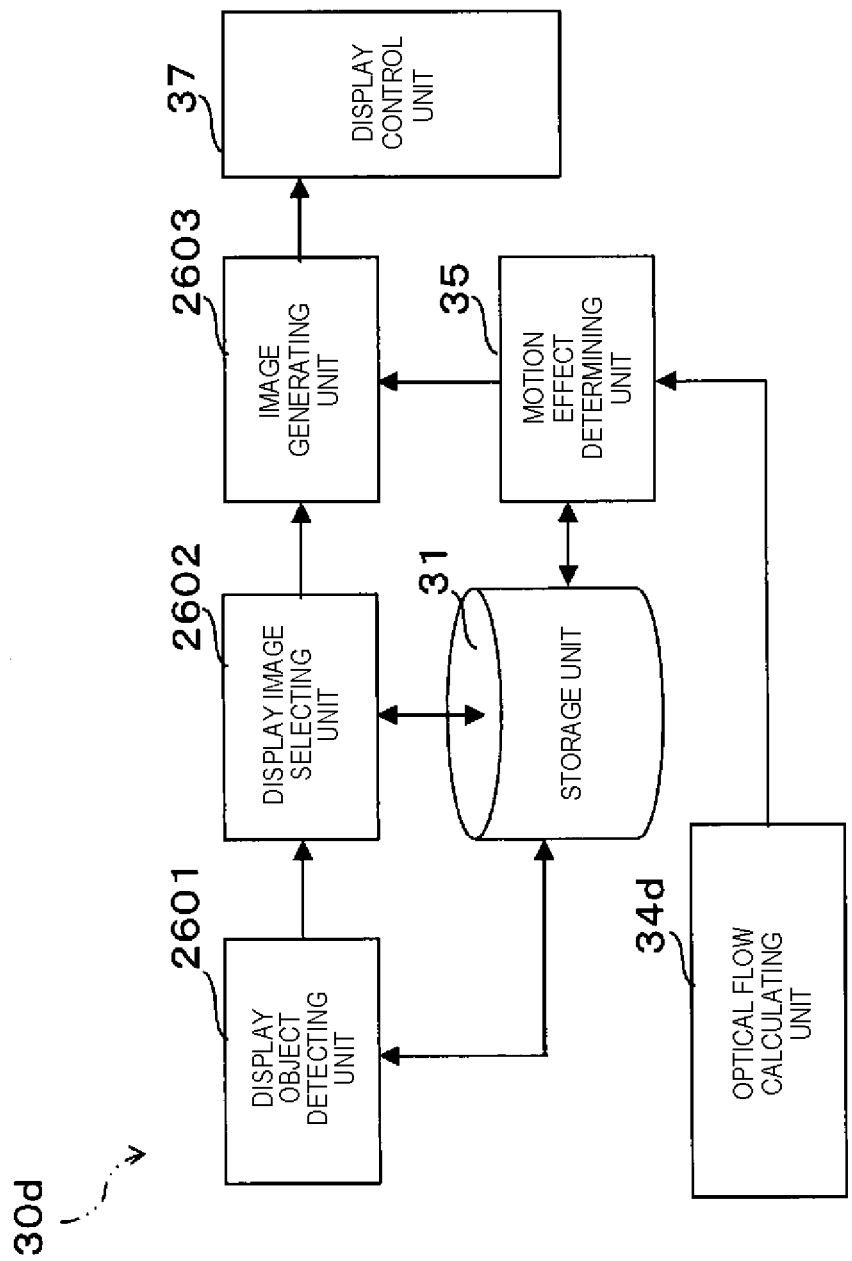
FIG. 33 is a block diagram illustrating the internal structure of the in-vehicle information display apparatus, which is the information display apparatus according to the fourth embodiment.

Next, an in-vehicle information display system including an in-vehicle information display apparatus according to a fourth embodiment with reference to FIG. 32. FIG. 32 is a system configuration diagram illustrating the structure of an in-vehicle information display system 10d including an in-vehicle information display apparatus 30d, which is an information display apparatus according to the fourth embodiment. In FIG. 32, the same components as those in FIG. 26 are denoted by the same reference numerals. Hereinafter, in the fourth embodiment, components different from those in the third embodiment and the operation of the components will be described and a description of the same content as that in the third embodiment will be omitted. The in-vehicle information display system 10d is different from the in-vehicle information display system 10c according to the third embodiment in that, instead of the camera 8, a speed sensor 14 and a yaw rate sensor 15 are connected to the optical flow calculating unit 34d and in an optical flow calculation process of the optical flow calculating unit 34d. FIG. 33 is a block diagram illustrating the internal structure of the in-vehicle information display apparatus 30d, which is the information display apparatus according to the fourth embodiment. The speed sensor 14 and the yaw rate sensor 15 are the same as the speed sensor 14 and the yaw rate sensor 15 according to the second embodiment.

The speed sensor 14 constantly detects the speed of the own vehicle 5 and outputs speed information related to the detected speed to the optical flow calculating unit 34d. The yaw rate sensor 15 constantly detects the rotational speed of the own vehicle 5 and outputs rotational speed information related to the detected rotational speed to the optical flow calculating unit 34d.

Next, the calculation process of the optical flow calculating unit 34d is the same as that of the optical flow calculating unit 34b in the second embodiment and thus will be described with reference to FIG. 15. FIG. 15 is a diagram illustrating the process of calculating the optical flow on the basis of the speed information and the rotational speed information output from the speed sensor 14 and the yaw rate sensor 15. In (a) of FIG. 15, reference numeral 151 indicates a virtual camera and reference numeral 152 indicates a motion vector when an arbitrary region 156 of the foreground is moved from a point $P(X_0, Y_0, Z_0)$ to a point $Q(X_1, Y_1, Z_1)$. In (b) of FIG. 15, reference numeral 153 indicates a straight component of the motion vector 152 as viewed from the virtual camera 151 and reference numeral 154 indicates a rotational component of the motion vector 152 as viewed from the virtual camera 151. In (c) of FIG. 15, reference numeral 155 indicates a vector of the optical flow of the image onto which the movement of the arbitrary region 156 of the foreground is projected by the virtual camera 151.

Next, a case in which the arbitrary region 156 of the foreground which is disposed at the coordinates of the point $P(X_0, Y_0, Z_0)$ is moved to the point $Q(X_1, Y_1, Z_1)$ after a predetermined period of time $\Delta t$ during the traveling of the own vehicle 5 as shown in (a) of FIG. 15 will be described. The virtual camera 151 which faces the front side in the traveling direction of the own vehicle 5 is considered and the optical flow which is calculated from the imaging surface of the virtual camera 151 is considered. The coordinate system of the virtual camera 151 which is the same as the coordinate system of the third embodiment shown in FIG. 9 is considered, the speed of the own vehicle 5 at a given time when the virtual camera 151 captures an image is referred to as a, and the rotational speed of the own vehicle 5, which is an angular velocity, is referred to as ω. When the arbitrary region 156 which is disposed at a given point $P(X_0, Y_0, Z_0)$ of the foreground is moved to a given point $Q(X_1, Y_1, Z_1)$ after a predetermined period of time $\Delta t$, the motion vector 152 from the point P to the point Q can be considered as the sum of the straight component 153 in the speed direction and the rotational component 154 about the virtual camera 151. Therefore, Expressions 9, 10, and 11 described in the second embodiment are established between the point P and the point Q.

When Expression 9 and Expression 11 are substituted into Expression 5 and Expression 9 and Expression 11 are also substituted into Expression 6, it is possible to calculate the vector 155 of the optical flow. It is possible to determine a motion effect to be added to the in-vehicle information image on the basis of the vector 155 of the optical flow calculated in this way, similarly to the third embodiment.

As described above, in the in-vehicle information display apparatus 30d, which is the information display apparatus according to the fourth embodiment, for example, the pedestrian 1, which is an object of the in-vehicle information image, is detected in the predetermined detection range 7 around the own vehicle 5. When an object of the in-vehicle information image is included in the detection information generated by the detection, the optical flow of the own vehicle 5 is calculated and the motion effect to be added to the in-vehicle information image is determined. The optical flow of the own vehicle 5 is calculated on the basis of the values output from the speed sensor 14 and the yaw rate sensor 15. The in-vehicle information image having the determined motion effect added thereto is displayed on the display unit 90 of the own vehicle 5.

Therefore, the in-vehicle information display apparatus 30d, which is the information display apparatus according to the fourth embodiment, can display in-vehicle information without being affected by the traveling state of the vehicle such that the driver can easily recognize the in-vehicle information without discomfort. In addition, the in-vehicle information display apparatus 30d according to the fourth embodiment can determine whether a target of the in-vehicle information which needs to be notified to the driver is detected around the vehicle with high accuracy on the basis of predetermined object in-vehicle information 2800. It is possible to determine whether the vehicle travels straight or the vehicle turns or rotates with high accuracy on the basis of the absolute values of the horizontal and vertical components of the calculated optical flow. It is possible to calculate the optical flow in the traveling direction of the vehicle on the basis of the speed information and the rotational speed information output from, for example, the speed sensor 14 and the yaw rate sensor 15 provided in the vehicle. In addition, it is easy for the driver to predict the display trajectory of the in-vehicle information image and the driver can easily recognize the displayed image and understand the content of the displayed image. Since the in-vehicle information image is periodically moved in a direction intersecting the main component of the vector of the calculated optical flow, it is easy for the driver to predict the display trajectory of the in-vehicle information image and the driver can easily recognize the displayed image and understand the content of the displayed image. In addition, since the in-vehicle information image is periodically moved in the direction intersecting the main component of the vector of the calculated optical flow, the driver can reduce the amount of movement of the line of sight after recognizing the displayed in-vehicle information image and easily understand the content of the displayed image.

Various embodiments have been described above with reference to the drawings, but the information display apparatus according to the invention is not limited to the above-described embodiments. It will be understood by those skilled in the art that various modifications and changes of the invention can be made within the range of the claims and the modifications and changes are also included in the technical scope of the invention. For example, the above-described embodiments may be appropriately combined with each other to display information without being affected by the traveling state of the vehicle such that the driver can easily recognize the information without discomfort.

In the fourth embodiment using the speed sensor 14 and the yaw rate sensor 15, it is possible to calculate the vector of the optical flow even though there is no image captured by the camera 8. Therefore, when an x component, which is the horizontal component of the vector of the optical flow corresponding to a combination of the output value of the speed sensor 14 and the output value of the yaw rate sensor 15, a y component, which is the vertical component of the vector, and an angle formed by the x component and the y component are stored in the table shown in (a) of FIG. 16 in advance, it is possible to determine the optimal movement direction of the motion effect to be added to the symbol image on the basis of the table. When the positional coordinates of a portion of the road surface that overlaps the overlap region of the HUD are known, the optimal movement direction of the motion effect to be added to the symbol image may be determined on the basis of the table shown in (b) of FIG. 16 that includes the positional coordinates as a parameter. FIG. 16 is a diagram illustrating an example of the table for calculating the angle formed between the horizontal component and the vertical component of the vector of the optical flow when a virtual camera is used. In FIG. 16, (a) is a diagram illustrating a table in which the speed of the vehicle, the angular velocity of the vehicle, and the angle formed between the horizontal component and the vertical component of the vector of the optical flow are associated with each other. In FIG. 16, (b) shows a table in which the positional coordinates of a portion of the road surface that overlaps the overlap region of the HUD, the speed of the vehicle, the angular velocity of the vehicle, and the angle formed between the horizontal component and the vertical component of the vector of the optical flow are associated with each other.

The position of the eyeball of the driver may be specified and the coordinate system based on the camera 8 may be converted into the coordinate system based on the position of the eyeball of the driver (or the middle point between the left and right eyeballs), thereby calculating the optical flow of the point of view of the driver. FIG. 24 is a diagram illustrating the structure of an information display system that calculates the position of the eyeball of the driver and calculates the optical flow corresponding to the point of view of the driver. The position of the eyeball of the driver can be calculated by a known positioning technique using a camera. In addition, the point of view of the image is converted by a known technique. Therefore, it is possible to convert the image captured by the camera 8 into an image corresponding to the point of view of the driver and calculate the optical flow of a portion of the converted image that overlaps the display region of the HUD.

In addition, the position and angle of the driver's seat may be considered. The background (overlap region) of the display position of the HUD viewed by the driver varies depending on the position and angle of the driver's seat. Therefore, when the position of the eyeball of the driver determined by the position and angle of the driver's seat is stored in the table in advance, the position of the eyeball of the driver is determined depending on the position and angle of the seat and it is possible to calculate the vector of the optical flow of a position on the road surface that is ahead of the display region of the HUD as viewed from the position of the eyeball.

In addition, it is possible to manually or automatically adjust the display position of the HUD such that it is easy for the driver to view the HUD. In this case, as shown in FIG. 17, the relationship between the display position (set position) of the HUD and a position on the road surface, which is the background, when the driver views the display position is stored as a table in advance. In this way, it is possible to calculate the vector of the optical flow on the basis of the table when the display position of the HUD is determined. FIG. 17 is a diagram illustrating an example of the table for setting the positional coordinates of the road surface that overlaps the overlap region of the HUD.

Specifically, for example, when the own vehicle 5 travels straight and a position on the road surface, which is the background of the display position, is far, the magnitude of the vector of the optical flow is small. When the position on the road surface is close, the magnitude of the vector is large. When the vehicle turns right or left, the direction of the vector of the optical flow is different from that when the vehicle travels straight, but the magnitude of the vector is equal to that when the vehicle travels straight.

In each of the above-described embodiments, the optical axis of the camera 8 including the virtual camera 151 is parallel to the Z-axis. However, the camera 8 may have a depression angle. In this case, similarly, it is possible to calculate the optical flow from a geometric relationship.

In the above-described embodiments, during the traveling of the own vehicle 5, the sensors 6a to 6d and the camera 8 constantly operate. However, the sensors 6a to 6d and the camera 8 may operate only when the speed of the vehicle is equal to or more than a predetermined value. The predetermined speed is equal to or more than, for example, 5 km/h. In addition, the sensors 6a to 6d and the camera 8 may start their operations at the same time as the engine of the own vehicle 5 starts, or they may operate only when the speed of the vehicle satisfies operation conditions that are predetermined by the driver.

In each of the above-described embodiments, the pedestrian 1 is detected. However, a bicycle or a vehicle may be detected. In this case, similarly, when the bicycle or the vehicle is registered as the kind of detection target in the symbol image management table, a symbol image is selected and a display image is displayed. In addition, only when the distance between the own vehicle 5 and a specific kind of object satisfies a predetermined condition, the object may be selected as the kind of detection information. The predetermined condition is, for example, "the distance between the own vehicle 5 and a specific kind of object is equal to or less than 10 [m]". In addition, the sensors 6a to 6d may detect the right turn of the own vehicle 5. When the own vehicle 5 is turning right, the sensors may detect only an approaching object on the right side of the own vehicle 5.

Figure 18:
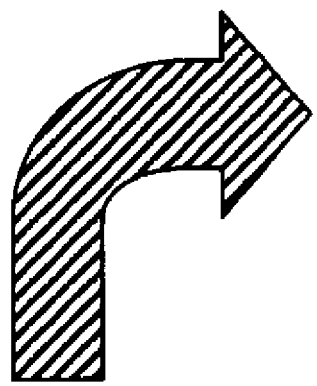
FIG. 18 is a diagram illustrating an example of a route guidance image.

In each of the above-described embodiments, the safe drive assistant application that detects the pedestrian 1, a bicycle, or a vehicle and calls the attention of the driver is given as an example. However, the invention can be applied to a route guidance application that uses, as the symbol image, a route guidance display image (FIG. 18) which is displayed on a car navigation apparatus when the vehicle turns right. FIG. 18 is a diagram illustrating an example of the route guidance image. In this case, for example, when the vehicle approaches a right turn position, the symbol image may be vibrated such that the driver can recognize the approach of the vehicle to the right turn position early without discomfort.

The invention can be similarly applied to display information, such as driving information (for example, device information and vehicle failure warning information), driving support information (for example, information about a traveling environment, information about signs, information for emphasizing the sense of vision, information about a blind spot, obstacle warning information, and information about lane departure, traffic violation, a drowsiness warning, and a recommended speed), in-vehicle environment information (for example, information about a clock, an air conditioner, and multimedia), and navigation information (for example, route guidance information and economic driving support information).

In each of the above-described embodiments, a method of determining the motion effect to be added to the symbol image in the horizontal direction or the vertical direction on the basis of the optical flow has been described. However, for example, the symbol image may be moved in various directions. For example, the motion effect may be added in a direction which is closest to the direction perpendicular to the optical flow direction among four directions, that is, the vertical direction, the horizontal direction, a diagonal direction from the upper right to the lower left, and a diagonal direction from the upper left to the lower right, as viewed from the driver. In addition, the number of ways to select the direction of the motion effect to be added may further increase. For example, as shown in FIG. 9, when the angle formed between the vector 132 of the optical flow and the direction of the x component is θ, the motion effect may be added in a direction which is closest to the direction perpendicular to the vector of the optical flow.

Figure 19:
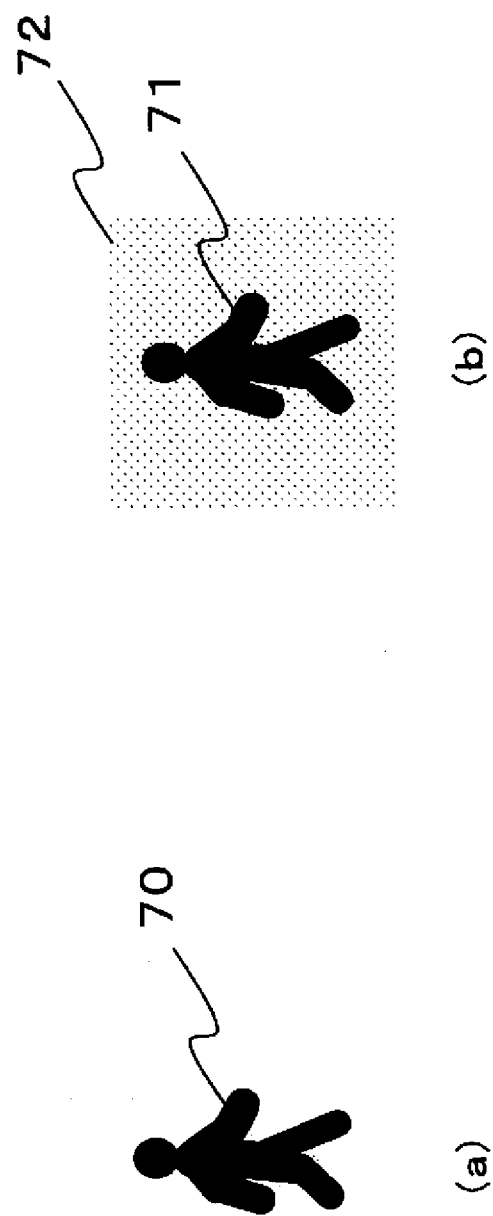
FIG. 19 is a diagram illustrating an example of a display image displayed on a display unit.

In each of the above-described embodiments, as shown in (a) of FIG. 19, the motion effect is added to the symbol image, which is a single image 70. However, for example, as shown in (b) of FIG. 19, an image captured as the symbol image 70 may include a first image 71 that needs to be notified to the driver and a second image (background image) 72 for improving the attractiveness of color for and visibility of the driver. FIG. 19 is a diagram illustrating an example of the display image displayed on the display unit. In FIG. 19, (a) shows an image including only a symbol image. In FIG. 19, (b) shows an image including a symbol image and a background image. In this case, when the first image 71 and the second image 72 are moved in the same way, the driver recognizes the images, but the visibility of the driver is reduced since the first image 71 is moved. Therefore, the display control unit 37 adds a motion effect to only the second image 72 and does not add a motion effect to the first image 71. In this way, it is possible to improve the visibility of the symbol image 70.

In each of the above-described embodiments, the method of calculating the optical flow from the image captured by the camera 8 and the method of calculating the optical flow on the basis of a combination of the output values from the speed sensor 14 and the yaw rate sensor 15 have been described. However, the optical flow may be estimated on the basis of GPS (Global Positioning System) information, a steering wheel, a turn signal, and the traveling state of the own vehicle 5.

In each of the above-described embodiments, the visual feature of the individual driver is not considered. The visual feature varies depending on a difference in age and individuals. For example, when a means for acquiring the age information of the driver and an age-visual feature information table are provided, the color and size of an image may be determined on the basis of the visual feature according to age (for example, eyesight, the spectral sensitivity of the eye, color contrast sensitivity, and brightness contrast sensitivity) such that it is relatively easy for a specific age group to view the image, and a motion effect for improving the attractiveness of color may be added to the symbol image. In addition, when the visual feature of the individual driver is checked in advance, an image is displayed on the basis of the visual feature data of the individual driver and the state of the driver. In this way, it is possible to display an image suitable for each driver such that the driver can easily recognize the image without being confused.

The motion effect added to the symbol image may be changed over time. The motion effect may be changed and displayed so as to gradually increase. For example, the amplitude of the motion of the symbol image increases and the period is reduced as the time from the start of the display of the symbol image passes.

In each of the above-described embodiments, the amplitude or period of vibration is constant regardless of the speed of the own vehicle 5. However, the size or the symbol image or the period of vibration may vary depending on the speed of the own vehicle 5. For example, as the speed of the own vehicle 5 increases, the size of the symbol image increases or the period of vibration of the motion effect added to the symbol image is reduced, according to the output value of the speed sensor 14.

In each of the above-described embodiments, the vibration of the own vehicle 5 is not considered. However, the vibration of the own vehicle 5 in the vertical direction may be detected. In this case, when the vibration of the own vehicle 5 in the vertical direction is large, the amplitude of the vibration of the symbol image may increase.

In the first and third embodiments, the sensors 6a to 6d and the camera 8 are not included in the information display apparatus 30a. However, the sensors 6a to 6d and the camera 8 may be included in the information display apparatus 30a. Similarly, in the second and fourth embodiments, the speed sensor 14 and the yaw rate sensor 15 are not included in the information display apparatus 30b. However, the speed sensor 14 and the yaw rate sensor 15 may be included in the information display apparatus 30b. In each of the above-described embodiments, the display unit 90 is not included in the information display apparatus 30. However, the display unit 90 may be included in the information display apparatus 30.

In the symbol image management table 40 shown in FIG. 28, the format of the kind of detection information is text data and the format of the symbol image is image data. However, the invention is not limited thereto. For example, when the image data of the symbol image is stored in another storage unit, the symbol image management table 40 may store, for example, the kind of detection information and an address used to access another storage unit that stores the symbol image.

Figure 20:
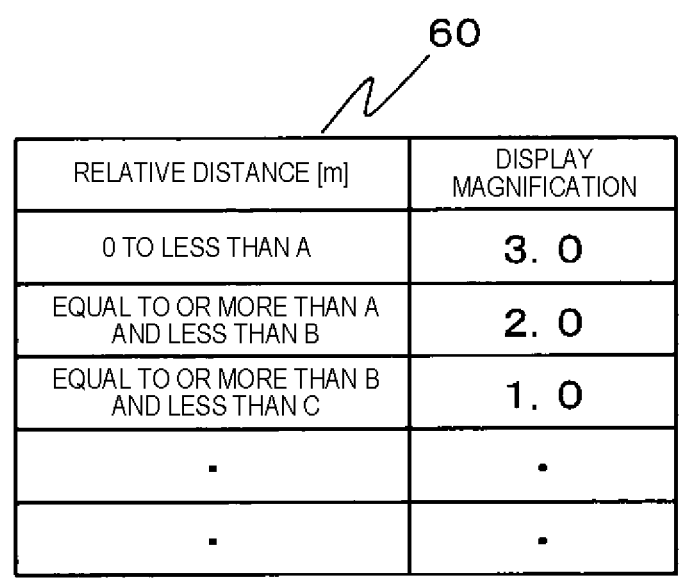
FIG. 20 is a diagram illustrating an example of display magnification condition information.

In addition, the information of the position or speed of an object to be detected relative to the own vehicle 5 may be used. In this case, the size of the display image may vary depending on the distance or speed. For example, as a relative distance increases, the display size of the display image increases. In addition, as a relative speed increases, the display size of the display image increases. When display magnification condition information 60 shown in FIG. 20 is stored in the storage unit 31, the information display apparatus 30 may determine the display magnification of the symbol image on the basis of, for example, the relative distance between the own vehicle 5 and the pedestrian 1 and display the symbol image. In FIG. 20, when the relative distance between the own vehicle 5 and the pedestrian 1 is less than A [m], the symbol image is displayed with a size that is three times more than the predetermined size of the image of an object to be displayed. When the relative distance is in the range of A [m] to B [m], the symbol image is displayed with a size that is two times more than the predetermined size. When the relative distance is in the range of B [m] to C [m], the symbol image is displayed with a size (normal size) equal to the predetermined size.

For example, the symbol images with different colors may be allocated such that the color of the symbol image is changed in the order of green, yellow, and red as the relative distance between the own vehicle 5 and a detection target is reduced. As the relative distance is reduced, the symbol image with higher luminosity may be allocated. As the relative distance is reduced, the symbol image with higher chroma may be allocated. Alternatively, as the relative distance is reduced, the symbol image with higher brightness may be allocated. The symbol image may be allocated depending on a TTC (Time To Collision) value which is calculated from the relative distance and the relative speed between the own vehicle 5 and a detection target. In addition, the symbol image may vary depending on the position of a detection target relative to the own vehicle 5. For example, the symbol image of a right-facing bicycle is allocated to a bicycle that approaches from the left side and the symbol image of a left-facing bicycle is allocated to a bicycle that approaches from the right side.

In the invention, the symbol image is selected on the basis of the detected attention object. However, the attention object may be trimmed from the acquired camera image and the image of the trimmed attention object may be displayed on the HUD instead of the symbol image.

In the invention, the HUD displays an image so as to overlap the background through the windshield. However, an image may be displayed on a small opaque display that is provided in front of the driver.

This application s based on Japanese patent application (No. 2009-280559) filed on Dec. 10, 2009, the contents of which are incorporated by reference.

INDUSTRIAL APPLICABILITY

The information display apparatus and the information display method according to the invention are useful as a device and method which is a part of a driving safety support system provided in the vehicle. In addition, the information display apparatus and the information display method may be used for a route guidance application. For example, the information display apparatus and the information display method may be incorporated as a part of a navigation apparatus and use a route guidance image as a symbol image.

REFERENCE SIGNS LIST

| | |
|---|---|
| 1: | PEDESTRIAN |
| 5: | VEHICLE |
| 6a to 6d: | SENSOR |
| 7: | DETECTION RANGE |
| 8, 2401: | CAMERA |
| 9: | IMAGING RANGE |
| 10a to 10e: | INFORMATION DISPLAY SYSTEM |
| 14: | SPEED SENSOR |
| 15: | YAW RATE SENSOR |
| 20, 70: | SYMBOL IMAGE |
| 21: | DISPLAY REGION |
| 22: | WINDSHIELD |
| 23: | ROOM MIRROR |
| 30a TO 30e: | INFORMATION DISPLAY APPARATUS |
| 31: | STORAGE UNIT |
| 32: | ATTENTION OBJECT DETECTING UNIT |
| 33: | SYMBOL IMAGE SELECTING UNIT |
| 34a TO 34e: | OPTICAL FLOW CALCULATING UNIT |
| 35: | MOTION EFFECT DETERMINING UNIT |
| 36: | DISPLAY IMAGE GENERATING UNIT |
| 37: | DISPLAY CONTROL UNIT |
| 40: | SYMBOL IMAGE SELECTION TABLE |
| 50: | MOTION EFFECT DETERMINATION TABLE |
| 60: | DISPLAY MAGNIFICATION CONDITION INFORMATION |
| 71: | FIRST IMAGE |
| 72: | SECOND IMAGE |
| 80: | DRIVER |
| 81: | HUD UNIT |
| 82: | LIGHT EMITTED FROM HUD |
| 83: | LINE OF SIGHT |
| 84: | STRAIGHT LINE |
| 85: | ROAD SURFACE |
| 86: | OVERLAP REGION |
| 87: | POSITION OF EYEBALL |
| 90: | DISPLAY UNIT |
| 111, 121, 132, 155: | VECTOR OF OPTICAL FLOW |
| 131: | CENTER OF LENS |
| 133: | MOTION VECTOR |
| 151: | VIRTUAL CAMERA |
| 152: | MOTION VECTOR |
| 153: | STRAIGHT COMPONENT |
| 154: | ROTATIONAL COMPONENT |
| 156: | ARBITRARY REGION OF FOREGROUND |
| 2402: | EYEBALL POSITION CALCULATING UNIT |
| 2403: | OVERLAP REGION CALCULATING UNIT |
| 2601: | DISPLAY OBJECT DETECTING UNIT |
| 2602: | DISPLAY IMAGE SELECTING UNIT |
| 2603: | IMAGE GENERATING UNIT |
| 2800: | OBJECT IN-VEHICLE INFORMATION |
| 2900: | MOTION EFFECT CONDITION INFORMATION |

The invention claimed is:

1. An information display apparatus that is provided in a vehicle including a first camera which captures a foreground image, the information display apparatus comprising:
an optical flow calculating unit that is configured to acquire a plurality of foreground images captured by the first camera and to calculate vector information of an optical flow of a foreground on the basis of the acquired plurality of foreground images;
a motion effect determining unit that is configured to acquire the vector information of the optical flow from the optical flow calculating unit and to determine a motion effect of a predetermined image on the basis of the acquired vector information of the optical flow; and
a display unit that is configured to display the predetermined image while being moved in accordance with the motion effect determined by the motion effect determining unit.

2. The information display apparatus according to claim 1, wherein
the motion effect is a vibration method, and
the motion effect determining unit determines the vibration method of the predetermined image on the basis of the vector information of the optical flow.

3. The information display apparatus according to claim 1, wherein
the motion effect is an expansion and contraction method, and
the motion effect determining unit determines the expansion and contraction method of the predetermined image on the basis of the vector information of the optical flow.

4. The information display apparatus according to claim 1, further comprising:
a display image generating unit that is configured to acquire information of the motion effect determined by the motion effect determining unit and to add the motion effect to the predetermined image to generate a display image to be displayed by the display unit.

5. The information display apparatus according to claim 1, further comprising:
a storage unit in which is stored a detection target, which is an attention object;
an attention object detecting unit that is configured to compare information of the detection target acquired from a sensor, which is provided in the vehicle and detects the detection target around the vehicle, with the information of the detection target acquired from the storage unit and to determine whether the detection target acquired from the sensor is an attention object; and
a symbol image selecting unit that is configured to select a symbol image corresponding to the acquired detection target when the attention object detecting unit determines that the detection target acquired from the sensor is the attention object, wherein
the display unit displays the symbol image as the predetermined image while being moved in accordance with the motion effect determined by the motion effect determining unit.

6. The information display apparatus according to claim 1, further comprising:
a gaze direction detecting unit that includes a second camera which captures an image of the driver of the vehicle and is configured to detect a gaze direction of the driver on the basis of the captured image of the driver,
wherein the motion effect determining unit determines the motion effect of the predetermined image on the basis of vector information which is included in an overlap region between the foreground and a predetermined region including the gaze direction detected by the gaze direction detecting unit, among the vector information of the optical flow.

7. The information display apparatus according to claim 1, wherein
the motion effect determining unit determines the motion effect of the predetermined image on the basis of a comparison result of the magnitude of a vertical component and the magnitude of a horizontal component of the acquired vector information of the optical flow.

8. An information display apparatus that is provided in a vehicle including a sensor which detects speed information and rotational speed information, the information display apparatus comprising:
- an optical flow calculating unit that is configured to acquire the speed information and the rotational speed information from the sensor and to calculate vector information of an optical flow of a foreground on the basis of the acquired speed information and rotational speed information;
- a motion effect determining unit that is configured to acquire the vector information of the optical flow from the optical flow calculating unit and to determine a motion effect of a predetermined image on the basis of the acquired vector information of the optical flow; and
- a display unit that is configured to display the predetermined image while being moved in accordance with the motion effect determined by the motion effect determining unit.

9. An information display method that is implemented in a vehicle including a camera which captures a foreground image, the information display method comprising:
- allowing an optical flow calculating unit to acquire a plurality of foreground images captured by the camera and to calculate vector information of an optical flow of a foreground on the basis of the acquired plurality of foreground images;
- allowing a motion effect determining unit to acquire the vector information of the optical flow from the optical flow calculating unit and to determine a motion effect of a predetermined image on the basis of the acquired vector information of the optical flow; and
- allowing a display unit to display the predetermined image while being moved in accordance with the motion effect determined by the motion effect determining unit.

* * * * *